United States Patent
McGavran et al.

(10) Patent No.: US 9,317,813 B2
(45) Date of Patent: Apr. 19, 2016

(54) MOBILE DEVICE WITH PREDICTIVE ROUTING ENGINE

(71) Applicant: Apple. Inc., Cupertino, CA (US)

(72) Inventors: Christine B. McGavran, Pacifica, CA (US); Bradford A. Moore, San Francisco, CA (US); Gregory D. Bolsinga, San Francisco, CA (US); Michael P. Dal Santo, San Francisco, CA (US); Lukas Marti, San Jose, CA (US); Seejo K. Pylappan, Cupertino, CA (US); Marcel van Os, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 155 days.

(21) Appl. No.: 13/843,796

(22) Filed: Mar. 15, 2013

(65) Prior Publication Data

US 2014/0279723 A1    Sep. 18, 2014

Related U.S. Application Data

(60) Provisional application No. 61/800,908, filed on Mar. 15, 2013.

(51) Int. Cl.
   *G06F 17/00*    (2006.01)
   *G06F 17/20*    (2006.01)
   (Continued)

(52) U.S. Cl.
   CPC .......... *G06N 99/005* (2013.01); *G01C 21/3617* (2013.01)

(58) Field of Classification Search
   None
   See application file for complete search history.

(56) References Cited

U.S. PATENT DOCUMENTS

| | | |
|---|---|---|
| 4,914,605 A | 4/1990 | Loughmiller, Jr. et al. |
| 6,321,158 B1 | 11/2001 | DeLorme et al. |

(Continued)

FOREIGN PATENT DOCUMENTS

| | | |
|---|---|---|
| CN | 101438133 | 5/2009 |
| DE | 1995564 | 11/2008 |

(Continued)

OTHER PUBLICATIONS

Next place predictions based on user mobility traces Prabhala, Bhaskar; La Porta, Thomas Computer Communications Workshops (INFOCOM WKSHPS), 2015 IEEE Conference on Year: 2015 pp. 93-94, DOI: 10.1109/INFCOMW.2015.7179359 Referenced in: IEEE Conference Publications.*

(Continued)

*Primary Examiner* — Michael B Holmes
(74) *Attorney, Agent, or Firm* — Adeli LLP

(57) ABSTRACT

Some embodiments of the invention provide a mobile device with a novel route prediction engine that (1) can formulate predictions about current or future destinations and/or routes to such destinations for the device's user, and (2) can relay information to the user about these predictions. In some embodiments, this engine includes a machine-learning engine that facilitates the formulation of predicted future destinations and/or future routes to destinations based on stored, user-specific data. The user-specific data is different in different embodiments. In some embodiments, the stored, user-specific data includes data about any combination of the following (1) previous destinations traveled to by the user, (2) previous routes taken by the user, (3) locations of calendared events in the user's calendar, (4) locations of events for which the user has electronic tickets, and (5) addresses parsed from recent e-mails and/or messages sent to the user. The device's prediction engine only relies on user-specific data stored on the device in some embodiments, relies only on user-specific data stored outside of the device by external devices/servers in other embodiments, and relies on user-specific data stored both by the device and by other devices/servers in other embodiments.

26 Claims, 12 Drawing Sheets

(51) Int. Cl.
*G06N 99/00* (2010.01)
*G01C 21/36* (2006.01)

(56) References Cited

U.S. PATENT DOCUMENTS

| | | | |
|---|---|---|---|
| 6,710,774 | B1 | 3/2004 | Kawasaki et al. |
| 7,634,463 | B1 | 12/2009 | Katragadda et al. |
| 7,702,456 | B2 | 4/2010 | Singh |
| 7,831,384 | B2 | 11/2010 | Bill |
| 8,020,104 | B2 | 9/2011 | Robarts et al. |
| 8,205,157 | B2* | 6/2012 | Van Os et al. ............ 715/702 |
| 8,255,830 | B2* | 8/2012 | Ording et al. ............ 715/810 |
| 8,355,862 | B2 | 1/2013 | Matas et al. |
| 8,370,736 | B2* | 2/2013 | Ording et al. ............ 715/234 |
| 8,463,289 | B2 | 6/2013 | Shklarski et al. |
| 8,464,182 | B2 | 6/2013 | Blumenberg et al. |
| 8,509,816 | B2* | 8/2013 | Branch et al. ............ 455/456.3 |
| 8,510,665 | B2* | 8/2013 | Ording et al. ............ 715/763 |
| 8,564,544 | B2* | 10/2013 | Jobs et al. ............ 345/173 |
| 8,584,050 | B2* | 11/2013 | Ording et al. ............ 715/864 |
| 8,606,516 | B2 | 12/2013 | Vertelney et al. |
| 8,607,167 | B2 | 12/2013 | Matas et al. |
| 8,639,654 | B2 | 1/2014 | Vervaet et al. |
| 8,756,534 | B2* | 6/2014 | Ording et al. ............ 715/864 |
| 8,881,060 | B2* | 11/2014 | Chaudhri et al. ............ 715/835 |
| 8,881,061 | B2* | 11/2014 | Chaudhri et al. ............ 715/835 |
| 8,918,736 | B2* | 12/2014 | Jobs et al. ............ 715/780 |
| 8,954,524 | B1* | 2/2015 | Hamon ............ 709/213 |
| 9,170,122 | B2* | 10/2015 | Moore ............ G01C 21/3632 |
| 9,200,915 | B2* | 12/2015 | Vulcano ............ G01C 21/36 |
| 2004/0128066 | A1 | 7/2004 | Kudo et al. |
| 2005/0125148 | A1 | 6/2005 | Van Buer et al. |
| 2005/0131631 | A1 | 6/2005 | Nakano et al. |
| 2005/0149261 | A9 | 7/2005 | Lee et al. |
| 2006/0004680 | A1 | 1/2006 | Robarts et al. |
| 2006/0015246 | A1 | 1/2006 | Hui |
| 2006/0173841 | A1 | 8/2006 | Bill |
| 2006/0287818 | A1 | 12/2006 | Okude et al. |
| 2007/0135990 | A1 | 6/2007 | Seymour et al. |
| 2007/0293958 | A1 | 12/2007 | Stehle et al. |
| 2009/0005981 | A1 | 1/2009 | Forstall et al. |
| 2009/0037093 | A1 | 2/2009 | Kurihara et al. |
| 2009/0157294 | A1 | 6/2009 | Geelen et al. |
| 2010/0045704 | A1 | 2/2010 | Kim |
| 2010/0100310 | A1 | 4/2010 | Eich et al. |
| 2010/0185382 | A1 | 7/2010 | Barker et al. |
| 2010/0328100 | A1 | 12/2010 | Fujiwara et al. |
| 2011/0161001 | A1 | 6/2011 | Fink |
| 2011/0194028 | A1 | 8/2011 | Dove et al. |
| 2011/0238289 | A1 | 9/2011 | Lehmann et al. |
| 2012/0035924 | A1 | 2/2012 | Jitkoff et al. |
| 2012/0059812 | A1 | 3/2012 | Bliss et al. |
| 2012/0179365 | A1 | 7/2012 | Miyahara et al. |
| 2012/0208559 | A1 | 8/2012 | Svendsen et al. |
| 2012/0265433 | A1 | 10/2012 | Viola et al. |
| 2012/0322458 | A1 | 12/2012 | Shklarski et al. |
| 2013/0166096 | A1 | 6/2013 | Jotanovic |
| 2013/0238241 | A1 | 9/2013 | Chelotti et al. |
| 2013/0325856 | A1* | 12/2013 | Soto Matamala ... G06F 17/3089 707/724 |
| 2014/0278051 | A1* | 9/2014 | McGavran ............ G01C 21/00 701/400 |
| 2014/0278070 | A1* | 9/2014 | McGavran ............ G01C 21/00 701/465 |
| 2014/0279723 | A1* | 9/2014 | McGavran ............ G06N 99/005 706/11 |
| 2014/0364149 | A1* | 12/2014 | Marti ............ G01C 21/34 455/456.3 |
| 2014/0364150 | A1* | 12/2014 | Marti ............ G01C 21/34 455/456.3 |
| 2014/0365113 | A1* | 12/2014 | McGavran ............ G01C 21/00 701/425 |

FOREIGN PATENT DOCUMENTS

| | | |
|---|---|---|
| EP | 2369299 | 9/2011 |
| EP | 2672225 | 12/2013 |
| EP | 2672226 | 12/2013 |
| EP | 2698968 | 2/2014 |
| WO | WO 2011/146141 | 11/2011 |
| WO | WO 2012/034581 | 3/2012 |
| WO | WO 2012/141294 | 10/2012 |
| WO | WO 2013/184348 | 12/2013 |
| WO | WO 2013/184444 | 12/2013 |
| WO | WO 2013/184449 | 12/2013 |
| WO | WO 2014/145127 | 9/2014 |
| WO | WO 2014/145145 | 9/2014 |
| WO | WO 2014/151155 | 9/2014 |

OTHER PUBLICATIONS

A blind navigation system using RFID for indoor environments Chumkamon, S.; Tuvaphanthaphiphat, P.; Keeratiwintakorn, P. Electrical Engineering/Electronics, Computer, Telecommunications and Information Technology, 2008. ECTI-CON 2008. 5th International Conference on Year: 2008, vol. 2 pp. 765-768, DOI: 10.1109/ECTICON.2008.4600543.*

A location-aware user tracking and prediction system Al Ridhawi, I.; Aloqaily, M.; Karmouch, A.; Agoulmine, N. Information Infrastructure Symposium, 2009. GIIS '09. Global Year: 2009 pp. 1-8, DOI: 10.1109/GIIS.2009.5307076 Referenced in: IEEE Conference Publications.*

Human Motion Prediction for Indoor Mobile Relay Networks Archibald, C.; Ying Zhang; Juan Liu High Performance Computing and Communications (HPCC), 2011 IEEE 13th International Conference on Year: 2011 pp. 989-994, DOI: 10.1109/HPCC.2011.145 Referenced in: IEEE Conference Publications.*

Next place predictions based on user mobility traces Prabhala, B.; La Porta, T. Computer Communications Workshops (INFOCOM WKSHPS), 2015 IEEE Conference on Year: 2015 pp. 93-94, DOI: 10.1109/INFCOMW.2015.7179359 IEEE Conference Publications.*

A blind navigation system using RFID for indoor environments Chumkamon, S.; Tuvaphanthaphiphat, P.; Keeratiwintakorn, P. Electrical Engineering/Electronics, Computer, Telecommunications and Information Technology, ECTI-CON 5th Int. Conf. on Year: 2008, vol. 2 pp. 765-768, DOI: 10.1109/ECTICON.2008.4600543 IEEE Conference Publications.*

A location-aware user tracking and prediction system Al Ridhawi, I.; Aloqaily, M.; Karmouch, A.; Agoulmine, N. Information Infrastructure Symposium, 2009. GIIS '09. Global Year: 2009 pp. 1-8, DOI: 10.1109/GIIS.2009.5307076 IEEE Conference Publications.*

Human Motion Prediction for Indoor Mobile Relay Networks Archibald, C.; Ying Zhang; Juan Liu High Performance Computing and Communications (HPCC), 2011 IEEE 13th International Conference on Year: 2011 pp. 989-994, DOI: 10.1109/HPCC.2011.145 IEEE Conference Publications.*

International Search Report and Written Opinion for PCT/US2014/025121, Aug. 12, 2014 (mailing date), Apple. Inc.

Author Unknown, "Android 2.3.4 User's Guide", May 20, 2011, pp. 1-384, Google, Inc.

Author Unknown, "Garmin. nüvi 1100/1200/1300/1400 series owner's manual," Jan. 2011, 72 pages, Garmin Corporation, No. 68, Jangshu $2^{nd}$ Road, Sijhih, Taipei County, Taiwan.

Author Unknown, "Google Maps Voice Navigation in Singapore," software2tech, Jul. 20, 2011, 1 page, available at http://www.youtube.com/watch?v=7B9JN7BkvME.

Author Unknown, "'Touch & Go' Owner's Manual," Jul. 2011, 218 pages, Toyota, United Kingdom.

Ruhs, Chris, "My Favorite Android Apps: Maps," Jun. 24, 2011, 1 page, available at http://www.youtube.com/watch?v=v2aRkLkLT3s.

PCT/US2014/029859, Mar. 14, 2014 (filing date), Apple. Inc.

Invitation to Pay Additional Fees with Partial Search Report for PCT/US2014/029859, Jul. 31, 2014 (mailing date), Apple. Inc.

(56) References Cited

OTHER PUBLICATIONS

PCT/US2014/029828, Mar. 14, 2014 (filing date), Apple. Inc.
Invitation to Pay Additional Fees with Partial Search Report for PCT/US2014/029828, Aug. 12, 2014 (mailing date), Apple. Inc.
International Search Report and Written Opinion for PCT/US2014/029859, Nov. 3, 2014 (mailing date), Apple. Inc.
International Search Report and Written Opinion of PCT/US2014/029828, Feb. 9, 2015 (mailing date), Apple. Inc.

* cited by examiner

MOBILE DEVICE WITH PREDICTIVE ROUTING ENGINE

CLAIM OF BENEFIT TO PRIOR APPLICATIONS

This application claims the benefit of U.S. Provisional Patent Application 61/800,908, filed Mar. 15, 2013.

BACKGROUND

Mobile devices are moving towards having access to larger and larger amounts and varying types of personalized information, either stored on the device itself or accessible to the device over a network (i.e., in the cloud). This enables the owner/user of such a device to store and subsequently easily access this information about their lives. The information of use to the user of a mobile device may include their personal calendar (i.e., stored in a calendar application), their e-mail, mapping information (e.g., locations of user-entered locations, user-requested routes, etc.).

However, at the moment, these devices require users to specifically request information in order for the device to present the information. For instance, if a user wants a route to a particular destination, the user must enter information into the mobile device (e.g., via a touchscreen, voice input, etc.) requesting the route. Given the amount of data accessible to the mobile devices, a device that leverages this data in order to predict the information needed by a user would be useful.

BRIEF SUMMARY

Some embodiments of the invention provide a mobile device with a novel route prediction engine that (1) can formulate predictions about current or future destinations and/or routes to such destinations for the device's user, and (2) can relay information to the user about these predictions. In some embodiments, this engine includes a machine-learning engine that facilitates the formulation of predicted future destinations and/or future routes to destinations based on stored, user-specific data.

The user-specific data is different in different embodiments. In some embodiments, the stored, user-specific data includes data about any combination of the following: (1) previous destinations traveled to by the user, (2) previous routes taken by the user, (3) locations of calendared events in the user's calendar, (4) locations of events for which the user has electronic tickets, and (5) addresses parsed from recent e-mails and/or messages sent to the user. The device's prediction engine only relies on user-specific data stored on the device in some embodiments, relies only on user-specific data stored outside of the device by external devices/servers in other embodiments, and relies on user-specific data stored both by the device and by other devices/servers in other embodiments.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features as described here are set forth in the appended claims. However, for purposes of explanation, several embodiments are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Figure 1:
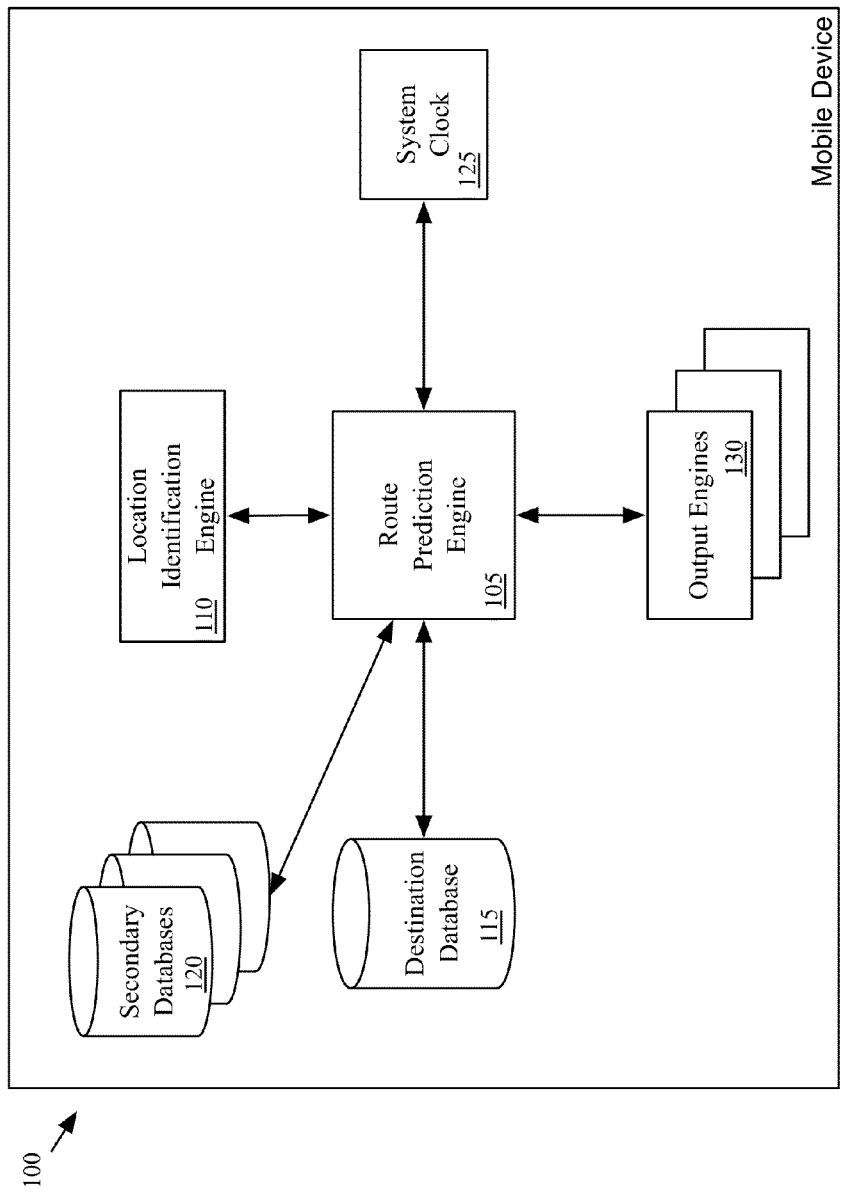
FIG. 1 illustrates an example of a mobile device with a novel route prediction engine.

FIG. 1 illustrates an example of a mobile device 100 with a novel route prediction engine 105. In some embodiments, the mobile device is a smartphone or a tablet computer with location identification, mapping and routing services. In addition to the route prediction engine 105, the device 100 includes a location identification engine 110, a route history data storage (e.g., database) 115, a number of secondary data storages (e.g., databases) 120, a system clock 125 and a number of output engines 130.

The route prediction engine 105 periodically performs automated processes that formulate predictions about current or future destinations of the device and/or formulate routes to such destinations for the device based on, e.g., the information stored in the databases 115 and 120. Based on these formulations, this engine then directs other modules of the device to relay relevant information to the user.

In different embodiments, the route prediction engine 105 performs its automated processes with different frequencies. For instance, to identify possible patterns of travel, it runs these processes once a day in some embodiments, several times a day in other embodiments, several times an hour in yet other embodiments, and several times a minute in still other embodiments. In addition, some embodiments allow the user of the device to configure how often or how aggressively the route prediction engine should perform its automated processes.

The system clock 125 specifies the time and date at any given moment, while the location identification engine 110 specifies the current location of the device. Different embodiments use different location identification engines. In some embodiments, this engine includes a global positioning system (GPS) engine that uses GPS data to identify the current location of the user. In some of these embodiments, this engine augments the GPS data with other terrestrial tracking data, such as triangulated cellular tower data, triangulated radio tower data, and correlations to known access points (e.g., cell-ID, Wi-Fi ID/network ID), in order to improve the accuracy of the identified location. In addition, some embodiments use one or more of the types of terrestrial tracking data without GPS data.

Based on the location of the device and the time and date information, the route prediction engine 105 determines when it should perform its processes, and what destinations and routes to predict. To formulate the predicted destinations and/or predicted routes, the prediction engine also uses previous location data that it retrieves from the route history database 115 and other secondary databases 120.

In some embodiments, the route history data storage 115 stores previous destinations that the device recorded for previous routes taken by the device. Also, this data storage in some embodiments stores location and motion histories regarding the routes taken by the device, including identification of locations at which user travel ended. Alternatively, or conjunctively, this storage stores in some embodiments other route data (e.g., routes that are each specified in terms of a set of travel directions). The secondary data storages 120 store additional locations that the route prediction engine 105 can use to augment the set of possible destinations for the device. Examples of such additional locations include addresses extracted from recent electronic messages (e.g., e-mails or text messages), locations of calendared events, locations of future events for which the device has stored electronic tickets, etc.

In some embodiments, the route prediction engine includes a machine-learning engine that facilitates the formulation of predicted future destinations and/or future routes to destinations based on the destination, location, motion histories that it retrieves from the route history data storage 115 and the secondary data storages 120. In some embodiments, this machine-learning engine is used by additional modules of the route prediction engine, including a predicted destination generator and a predicted route generator.

The predicted destination generator uses the machine-learning engine to create a more complete set of possible destinations for a particular time interval on a particular day. Various machine-learning engines can be used to perform such a task. In general, machine-learning engines can formulate a solution to a problem expressed in terms of a set of known input variables and a set of unknown output variables by taking previously solved problems (expressed in terms of known input and output variables) and extrapolating values for the unknown output variables of the current problem. In the case of generating a more complete set of possible destinations for a particular time interval on a particular day, the machine-learning engine is used to filter the route destinations stored in the route history data storage 115 and augment this set based on locations specified in the secondary data storages 120.

The predicted route generator then uses the machine-learning engine to create sets of associated destinations, with each set specified as a possible route for traveling. In some embodiments, each set of associated destinations includes start and end locations (which are typically called route destinations or endpoints), a number of locations in between the start and end locations, and a number of motion records specifying rate of travel (e.g., between the locations). In some embodiments, the predicted route generator uses the machine-learning engine to stitch together previously unrelated destination, location, and motion records into contiguous sets that specify potential routes. Also, in some embodiments, the route generator provides each of the sets of records that it generates to an external routing engine outside of the device (e.g., to a mapping service communicatively coupled to the device through a wireless network), so that the external routing service can generate the route for each generated set of associated records. One such approach will further described below by reference to FIG. 9. In other embodiments, the prediction route generator itself generates the route for each set of associated records.

Once the route prediction engine 105 has one or more specified predicted routes, it supplies its set of predicted routes and/or metadata information about these routes to one or more output engines 130. The output engines then relay one or more relevant pieces of information to the user of the device based on the data supplied by the routing engine. Examples of such output include: (1) displaying potential routes on a map, (2) dynamically updating potential routes on the map, (3) dynamically sorting and updating suggestions of possible destinations to search or to which to provide a route, (4) dynamically providing updates to potential routes in the notification center that a user may manually access, (5) providing automatic prompts regarding current or future routes, etc.

Figure 2:
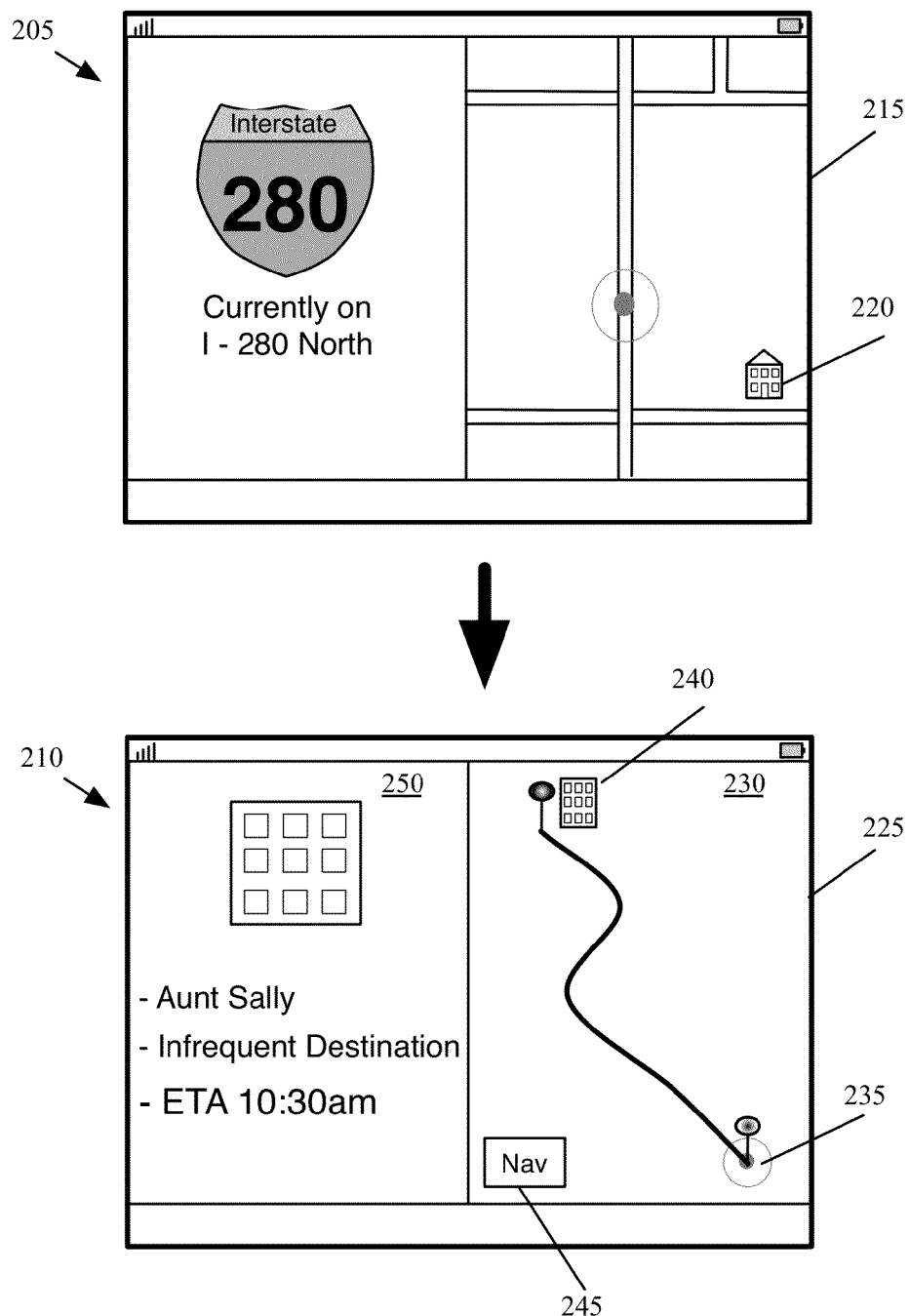
FIG. 2 illustrates an example of a map application that displays in a non-intrusive manner predicted routes identified by the route prediction engine.

Several such output presentations will now be described by reference to FIGS. 2-7. FIG. 2 illustrates an example of a map application that displays in a non-intrusive manner predicted routes identified by the route prediction engine. In some embodiments, the mobile device executes this application and displays its output on its display screen when the user has the map application operating in the foreground. In addition, the device in some embodiments transmits the output of the map application to a display screen in a vehicle through an interface that facilitates communication between the device and the vehicle. Accordingly, the display presentations illustrated in FIG. 2 can be either provided on the display screen of the mobile device or a display screen within a vehicle in which the user of the device is traveling.

The interface of some embodiments with the vehicle enables the device to provide a safe driving experience. In addition to the device performing certain tasks and presenting certain content (e.g., predicted destination and/or routes) automatically, without the need for user input, some embodiments additionally allow user input through voice controls, touch screen controls, and/or physical controls mounted on the dashboard or steering wheel, among other possibilities. Also, certain applications and/or tasks may be automatically invoked based on sensors of the electronic device or information provided to the electronic device by other devices, such as systems of the vehicle (through the vehicle-device interface). For example, route prediction) or other) tasks may be automatically invoked when the vehicle is started, or based on a current location as provided by a GPS or other location indication sensor.

This figure illustrates the operation of the map application in two stages 205 and 210 that correspond to two different instances in time during a trip from the user's home to the home of the user's aunt. Specifically, the first stage 205 corresponds to the start of the trip when the user has left his home 220. At this stage along the trip, the mobile device's prediction engine has not yet predicted the destination or the route to the destination. Accordingly, the map application provides a display presentation 215 that simply shows the location of the device along the road being traveled by the vehicle. This presentation also provides on its left side the identity of the road that is being currently traversed, which in this example is I-280 North. In this embodiment, this presentation 215 is simple and does not have a supplementary audio component because this presentation is not meant to distract the user as the user has not affirmatively requested a route to be identified or navigated.

As the vehicle continues along its path, the device's route prediction engine at some point identifies a predicted destination for the journey and a route to this destination. In the example illustrated in FIG. 2, this destination is the home of the user's aunt 240. As the user only rarely travels from his home to his aunt's house, the prediction engine did not immediately identify this destination, but instead needed to gather additional data about the direction of the user's travel to help identify the possible destination for this journey.

In some embodiments, the route prediction engine of some embodiments begins attempting to predict a destination for the device once determining that the device is in transit and therefore might want a destination. Different embodiments may use different factors or combinations of factors to make such a determination. For instance, the route prediction engine may use location information to identify that the device is now located on a road (e.g., I-280 North) and/or that the device is traveling at a speed associated with motorized vehicle travel.

The second stage 210 shows that once the device's route prediction engine identifies the aunt's house 240 as a possible destination and then identifies a route from the device to this possible destination, the map application changes the display presentation 215 to the display presentation 225. Like the presentation 215, the presentation 225 has two parts. The first part 230 displays a route between the device's current location 235 and the aunt's house 240. In some embodiments, this part also displays a UI affordance (e.g., a selectable item) 245 for initiating a vehicle navigation presentation so that the map application can provide turn-by-turn navigation instructions.

The second part 250 of the display presentation 225 provides the identity of the destination, some other data regarding this destination (e.g., the frequency of travel) and an ETA for the trip. Like the first display presentation 215, the second display presentation is rather non-intrusive because this presentation is not meant to distract the user as the user has not affirmatively requested a route to be identified or navigated.

Figure 3:
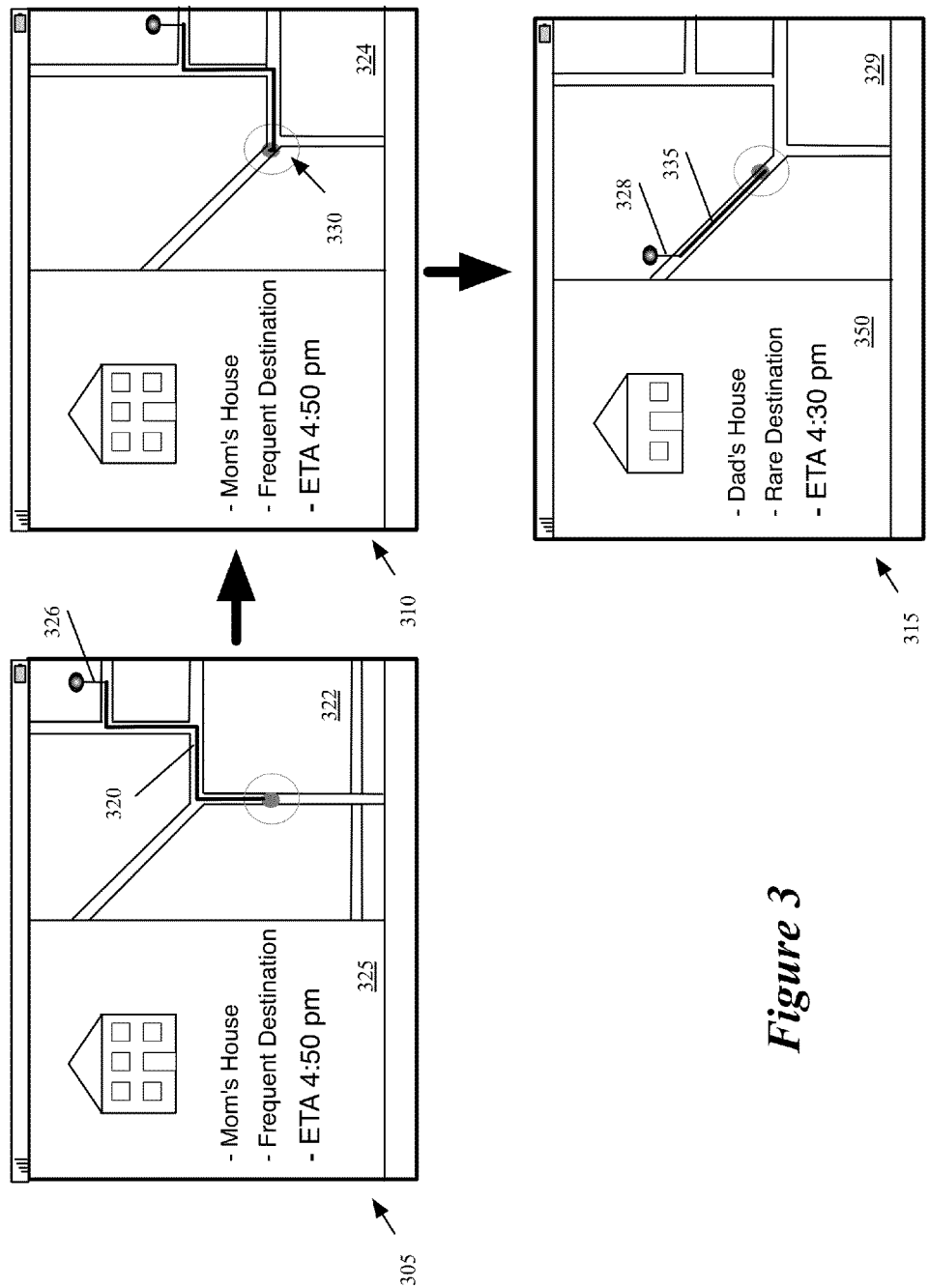
FIG. 3 illustrates a dynamic update by showing the map application switching from one predicted destination/route to another predicted destination/route.

The example illustrated in FIG. 2 illustrates that in some embodiments, the device's map application can dynamically update its predicted destination and route because the predicted route engine dynamically updates its predictions as it gathers more data from the user's direction of travel. FIG. 3 presents a more concrete example of this dynamic update as it shows the map application switching from one predicted destination/route to another predicted destination/route. This figure illustrates this example in three stages 305-315.

The first stage 305 shows the map application as providing a first presentation 322 of a first predicted route 320 to the house of the user's mother 326 and some information 325 about the predicted destination and the expected ETA. The second stage illustrates a second presentation 324 that is similar to the first presentation except that the user is shown to have reached an intersection 330 along the predicted route. As shown in the left part of the second presentation as well as the predicted route in the right part of the second presentation, the map application during the second stage is still predicting that the home of the user's mom is the eventual destination or the trip.

The third stage 315 shows that instead of turning right along the intersection to continue on the route to the mom's house, the user has taken a left turn towards the home of the user's father 328. Upon this turn, the map application provides a third presentation 329 that displays a second predicted route 335 to the father's house along with information 350 about the predicted destination and the expected ETA.

In many cases, the device's route prediction engine might concurrently identify multiple possible destination and routes to these destinations. In these situations, the prediction engine ranks each predicted destination or route based on a factor that quantifies the likelihood that they are the actual destination or route. This ranking can then be used to determine which destination or route is processed by the output engine that receives the predictions.

In both of the above examples, the predicted destinations are destination particular to the user (i.e., for other devices belonging to other people, the destination address predicted in stages 305 and 310 would not be "Mom's House"). In some embodiments, the device's route prediction engine uses stored contact information (e.g., an address book entry for "Mom" listing a physical address) combined with route history and motion history indicating that the particular physical address is a frequent destination in order to identify that the user is likely heading to "Mom's House".

Figure 4:
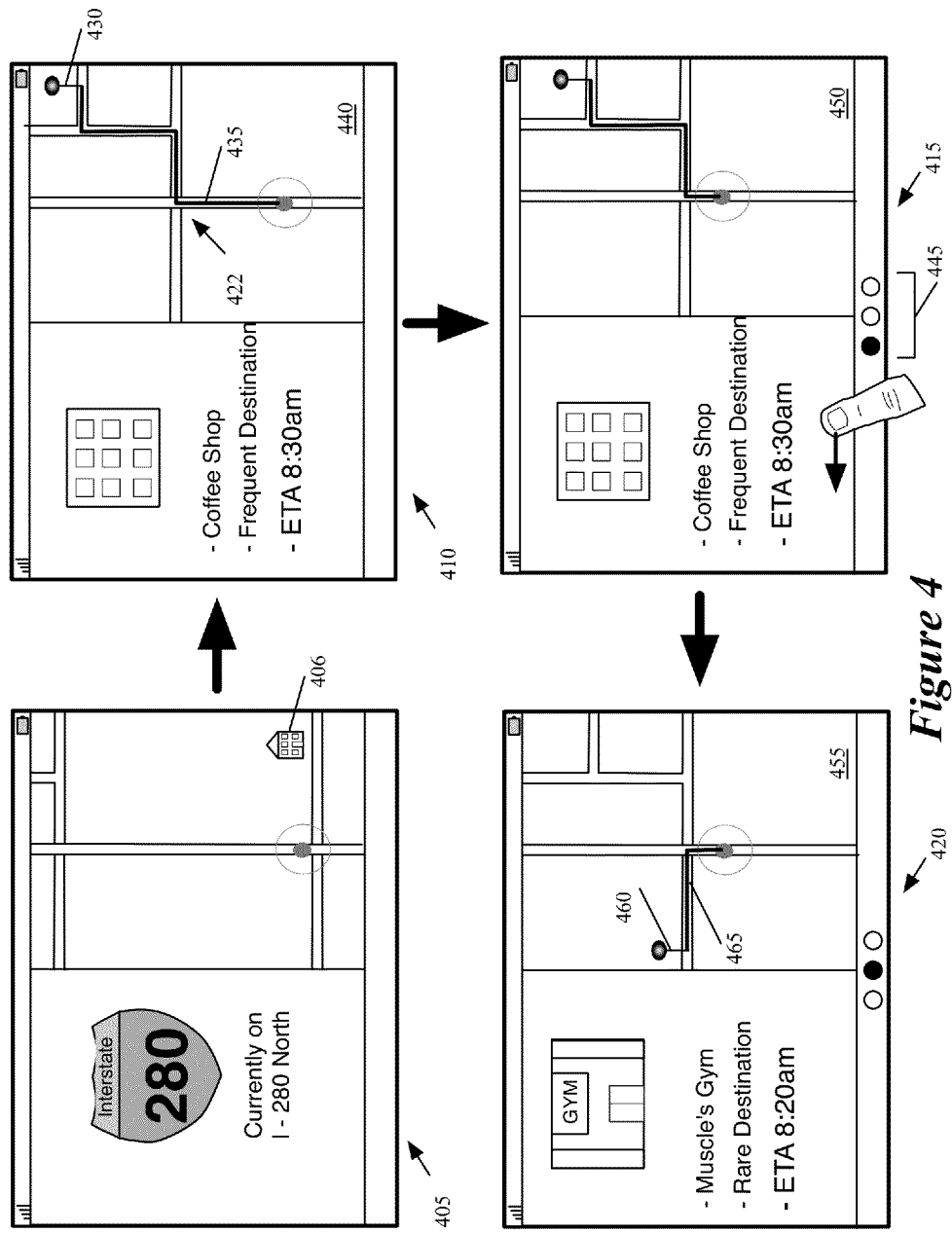
FIG. 4 illustrates an example of the map application handling multiple predicted destinations and/or routes.

FIG. 4 illustrates an example of the map application handling multiple predicted destinations and/or routes. This example is illustrated in terms of four operational stages 405-420 of the map application. The first stage 405 is similar to the first stage 205 of FIG. 2. A user has left his house 406 and is moving north on I-280. In this stage, the route prediction engine has not identified a possible destination or a route to a possible destination.

In the second stage 410, the user approaches an exit that is close to a coffee shop 430 that the user frequently attends. Accordingly, as the user reaches this exit, the prediction engine identifies the coffee shop 430 as a likely destination and predicts the route 435 to the coffee shop (or sends the predicted destination to a route generation server in order to for the server to generate and return the route 435). Once the map application receives these predictions, the application provides the second presentation 440 that shows the coffee shop 430 and the predicted route 435 to the coffee shop.

As the user reaches the exit 422, the route prediction engine identifies two other possible destinations for the user. Accordingly, the third stage 415 shows that as the user moves closer to the exit, three small circles 445 are added to the bottom of the presentation 450 of the map application. These three circles connote the existence of three predicted destinations/routes. The third stage 415 also shows the user performing a swipe operation on the presentation to navigate to another of the predicted destinations/routes. The user can perform such an action because in some embodiments the display (e.g., of the device or of the vehicle), which is displaying the presentation, has a touch sensitive screen. In addition to swipe gestures, some embodiments may accept other gestures, or selection of various affordances (e.g., left and right or up and down navigation arrows) in order to cycle through the different options.

If the presentation is being shown on a non-touch sensitive screen of a vehicle, the user can navigate to the next predicted destination/route through one of the keys, knobs, or other controls of the vehicle. While the previous FIGS. 2 and 3 do not show user interaction, one of ordinary skill in the art will recognize that the presentations displayed by the map application in these figures could be shown on a touch sensitive display of the device, of the vehicle, etc.

Regardless of how the user navigates to the next predicted destination/route, the map application presents the next predicted destination/route upon receiving the user's input. The fourth stage 420 of FIG. 4 illustrates the map application's presentation 455, which shows a gym 460 and a route 465 to the gym as another predicted destination/route. The map application did not initially show the route to the gym in the third stage because the route prediction engine assigned a lower probability to the gym being the actual destination as compared to the coffee shop, as the coffee shop has been a frequent stop of the user (as indicated in the second and third stages 410 and 415) while the gym has been a less frequent stop of the user (as indicated in the fourth stage 420). In addition to using frequency of arrival at particular destinations, the route prediction generator may use other information, such as the frequency with which the user requests a route to the destination (irrespective of whether the device actually travels to the destination), frequency of arrival at the destination at the particular day and time of day (e.g., the user may travel to a third destination in the area somewhat frequently, but only on the weekend or only in the afternoon). As examples, the user's workplace and/or a coffee shop may be common morning destinations (especially weekday mornings), whereas home or a favorite restaurant may be common nighttime destinations when the device's current location is at the user's work.

Figure 5:
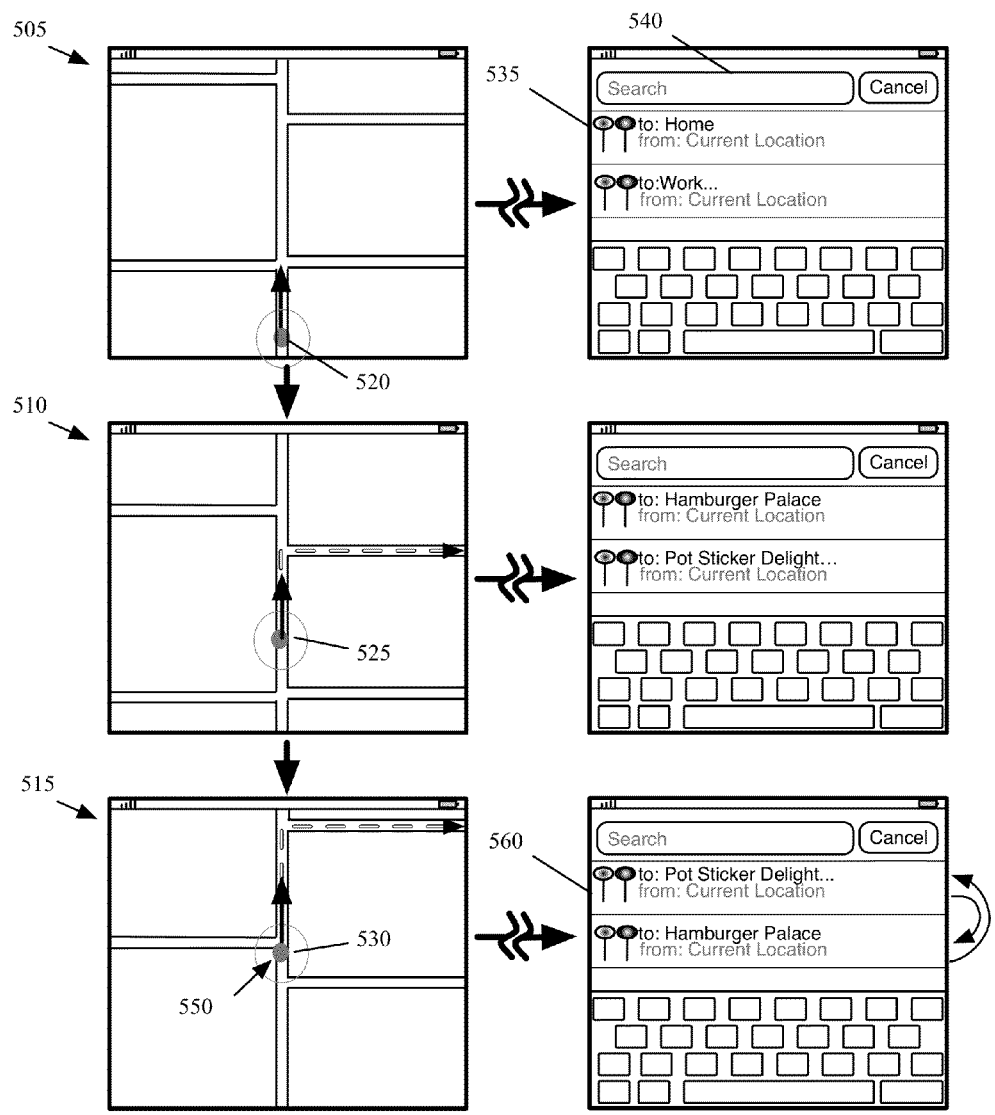
FIG. 5 illustrates an example of the map application dynamically defining and updating its "recents" suggestions based on predicted destinations received from the route.

In some embodiments, the map application uses the predicted destination/route to dynamically define and update other parts of its functionality in addition to or instead of its route guidance. FIG. 5 illustrates an example of the map application dynamically defining and updating its "recents" suggestions based on predicted destinations received from the route prediction engine. This example is illustrated in terms of three operations stages 505, 510 and 515 of the device that correspond to three different positions 520, 525 and 530 of the user along a route.

In each stage, the map application display a "recents" window 535 that opens when the search field 540 is selected. This window is meant to provide suggestions for possible destinations to a user. When the map application does not have a predicted destination, the recents window displays initially pre-specified destinations, such as the user's home and the user's work, as shown in the first stage 505. This stage corresponds to a start of a trip 520. At this time, the prediction engine has not identified a predicted destination. In addition to displaying the pre-specified destinations, some embodiments may additionally display for selection recently entered locations obtained from recent tasks performed on the device or on another device by the same user. For instance, the recents locations may include a location of a restaurant for which the user recently searched in a web browser, the address of a contact that the user recently contacted (e.g., via e-mail, message, phone call, etc.), the location of a device of a contact that the user recently contacted (if the user has permission to acquire that information), a source location of a recent route to the device's current location, etc.

The second stage 510 shows that at a later position 525 along the trip, the route prediction engine identifies two possible destinations, which are the Hamburger Palace and the Pot Sticker Delight. The prediction engine at this stage provides these two possible destinations to the map application, having assigned the Hamburger Palace a higher probability of being the actual destination. Accordingly, in the second stage 510, the map application replaces in the recents window the default Home and Work destinations with the Hamburger Palace and Pot Sticker Delight destinations as these have been assigned higher probabilities of being the eventual destination than the default choices (which may also have been assigned some small but non-zero probability of being the user's destination). Based on the assignment of a higher probability to Hamburger Palace as the eventual destination, the map application displays the Hamburger Palace higher than the Pot Sticker Delight on this page.

However, after the user passes an intersection 550 shown in the third position 530 along the route, the prediction engine (which regularly recalculates probabilities for possible destinations, in some embodiments) determines that the Pot Sticker Delight restaurant now has a higher probability than Hamburger Palace of being the eventual destination. The engine notifies the map application of this change, and in response, the map application swaps the order of these two choices in the recents window 560. In some embodiments, the prediction engine sends a list of possible destinations and their probabilities to the map application (e.g., a particular number of destinations, or all destinations above a particular probability) on a regular basis. In other embodiments, the map application sends a request to the prediction engine for a given number of possible destinations with the highest probabilities in a particular order.

Figure 6:
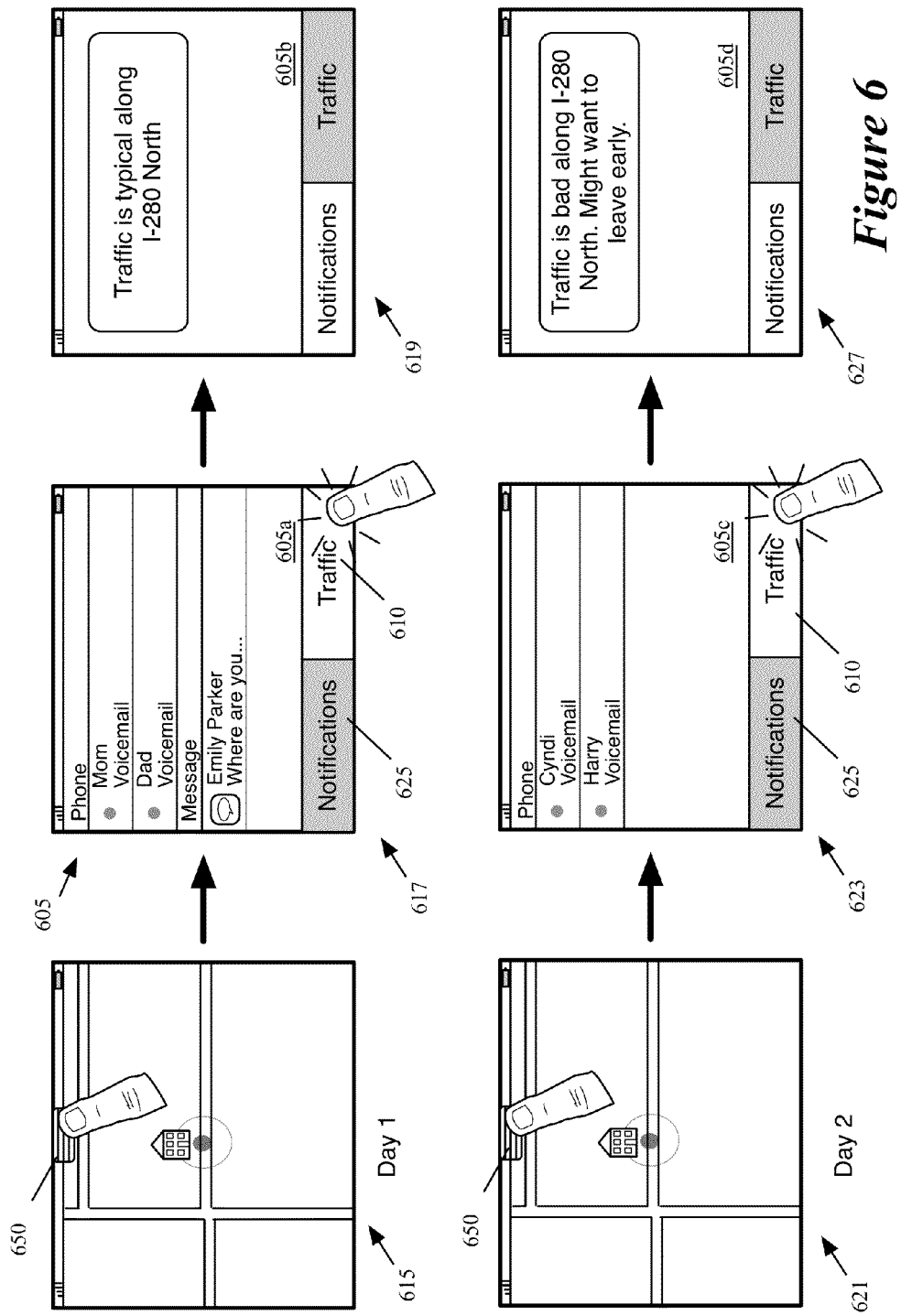
FIG. 6 illustrates a notification center display of some embodiments.
Figure 7:
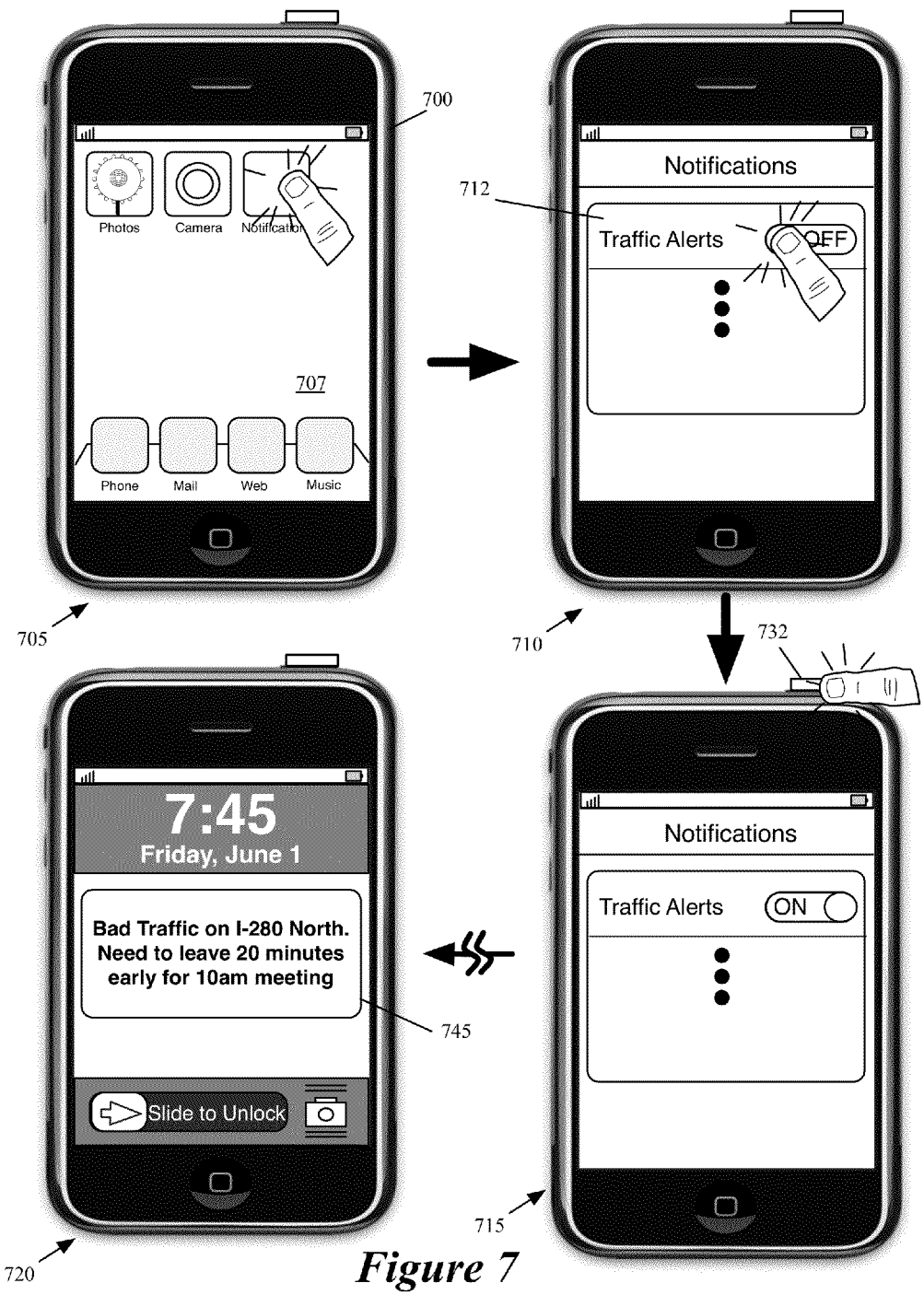
FIG. 7 illustrates an example of how the device's notification services in some embodiments uses the predicted route data to provide automated notification to a user.

In addition to the map application shown in the preceding four figures, many other applications operating on the mobile device can be clients for the predictions made by this device's route prediction engine. For instance, as illustrated by FIGS. 6 and 7, notification services of the device can be such clients. FIG. 6 illustrates a notification center display 605 of some embodiments. This notification center display is a window that can be manually requested by a user of the device whenever the user wishes to see an overview of alerts that are provided by various applications being executed on the device (e.g., voicemails and missed calls from the phone application, text messages from a messaging application, etc.).

The notification center display 605 of some embodiments includes a traffic tab 610 that, when selected, illustrates information about the traffic along predicted and/or in progress routes for the user. FIG. 6 illustrates the type of information that the traffic tab can provide in terms of the traffic along a predicted route on two consecutive days. Each day is shown in terms of three operational stages of the device.

On the first day, the user manually pulls on the notification center affordance 650 in the first stage 615. As shown by the second stage 617, this operation results in the presentation of the notification center display 605a. This display presents the enabled notification feature of this display (as indicated by the greyed out color of the notification affordance 625) and also presents a variety of notification alerts from a variety of applications. The second stage 617 also shows the user's touch selection of the traffic affordance 610.

As shown by the third stage 619, the selection of this affordance results in the presentation 605b of the traffic window, which states that traffic along I-280 north is typical for the predicted time of the user's departure. The expression of traffic as typical or atypical is highly useful because certain routes are always congested. Accordingly, a statement that the route is congested might not help the user. Rather, knowing that the traffic is better than usual, worse than usual, or the same as usual is more useful for the user.

In some embodiments, the notification services provide such normative expressions of traffic because the route prediction engine (1) predicts likely routes that the user might take at different time periods based on the user's historical travel patterns, and (2) compares the traffic along these routes to historical traffic levels along these routes. This engine then provides not only one or more predicted routes for the user but also normative quantification of the level of traffic along each of the predicted routes. When the engine provides more than one predicted route, the engine also provides probabilities for each predicted route that quantifies the likelihood that the predicted route is the actual route. Based on these probabilities, the notification manager can display traffic information about the most likely route, or creates a stacked, sorted display of such traffic information, much like the sorted, stacked display of routes explained above by reference to FIG. 4. That is, the user could perform a swipe interaction (or perform another interaction with the device) in order to cause the notification center to provide information for a different possible route (e.g., traffic information for US-101). In addition to providing probabilities for different routes to different destinations, the route prediction engine may identify two (or more) probabilities for two different routes to the same destination (e.g., if the user often takes two different routes to and/or from work based on his own assessment of the traffic).

On the second day, the user again manually pulls on the notification center affordance 650 in the first stage 621. As shown by the second stage 623, this operation again results in the presentation of the notification center display 605c. This display presents the enabled notification feature of this display (as indicated by the greyed out color of the notification affordance 625) and also presents a variety of notification alerts from a variety of applications. The second stage 623 also shows the user's touch selection of the traffic affordance 610.

As shown by the third stage 627, the selection of this affordance again results in a presentation 605d of the traffic window. In this case, the window states that traffic along I-280 north is worse than usual for the predicted time of the user's departure and that the user should consider leaving a little earlier than usual. The notification services provides this notice because the route prediction engine (1) has predicted that the user will likely take I-280 north, and (2) has compared today's traffic with historical traffic levels along this route to determine that traffic today is worse than usual.

While specific names are given to the two tabs of the notification center ("Notifications" and "Traffic"), one of ordinary skill in the art will recognize that different names or icons may be used to represent these tabs. For instance, the "Traffic" tab is called the "Today" tab in some embodiments. Similarly, other specific UI names and icons may be represented differently in different embodiments.

FIG. 7 provides another example of how the device's notification services in some embodiments uses the predicted route data to provide automated notification to a user. In this example, the device has a notification service called Traffic Alerts, which when enabled, allows the user to receive traffic alerts as automated prompts while the device screen is on or off.

The example in this figure is described in terms of four stages of operations of the device. The first stage 705 shows the user selecting the notification manager icon on a page 707 of the device 700. In some embodiments, the notification manager does not have an icon on the page 707, but rather is made available through a setting menu that is presented when a setting icon on page 707 or another page of the device's UI.

The second stage 710 shows the presentation of several notification controls, one of which is the traffic alert affordance 712. This affordance allows the traffic alert service of the notification manager to be turned on or off. The second stage shows the user turning on the traffic alert service, while the third stage 715 shows the notification page after this service has been turned on. The third stage 715 also shows the user turning off the screen of the device by pressing on a screen-off button 732 of the device.

The fourth stage 720 is a duration of time after the user has turned off the screen of the device. During this duration, the device's route prediction engine has identified that the user will likely take a predicted route and has also determined that this route is congested so much that the user will not likely make a 10 am meeting at a particular location that is indicated in the user's calendar. In this case, the prediction engine may have generated the predicted route based on the information in the user's calendar as well as the time of day and historical travel data for that time of day.

The prediction engine relays this information to the notification manager of the device, and in response, the notification manger generates a traffic alert prompt 745 that is illustrated in the fourth stage. This prompt notifies the user that traffic along the user's predicted route is worse than usual and that the user might wish to consider leaving 20 minutes earlier so that the user can make his 10 am meeting. By utilizing the calendar information, the device is able to identify the traffic congestion and alert the user while the user still has time to leave early for the meeting. When the user is on route and the device determines that the user will not be able to arrive at the meeting on time, the device can notify the user that he will be late, and enable the user to notify others participating in the meeting.

Instead of such a traffic alert, the notification manager in other embodiments provides other types of alerts, such as the normative ones (e.g., worse than usual, better than usual) described above. Also, while the example illustrated in FIG. 7 shows the traffic alert while the screen is off, the notification manager in some embodiments also provides such notifications while the screen is on, or only while the screen is on.

Figure 8:
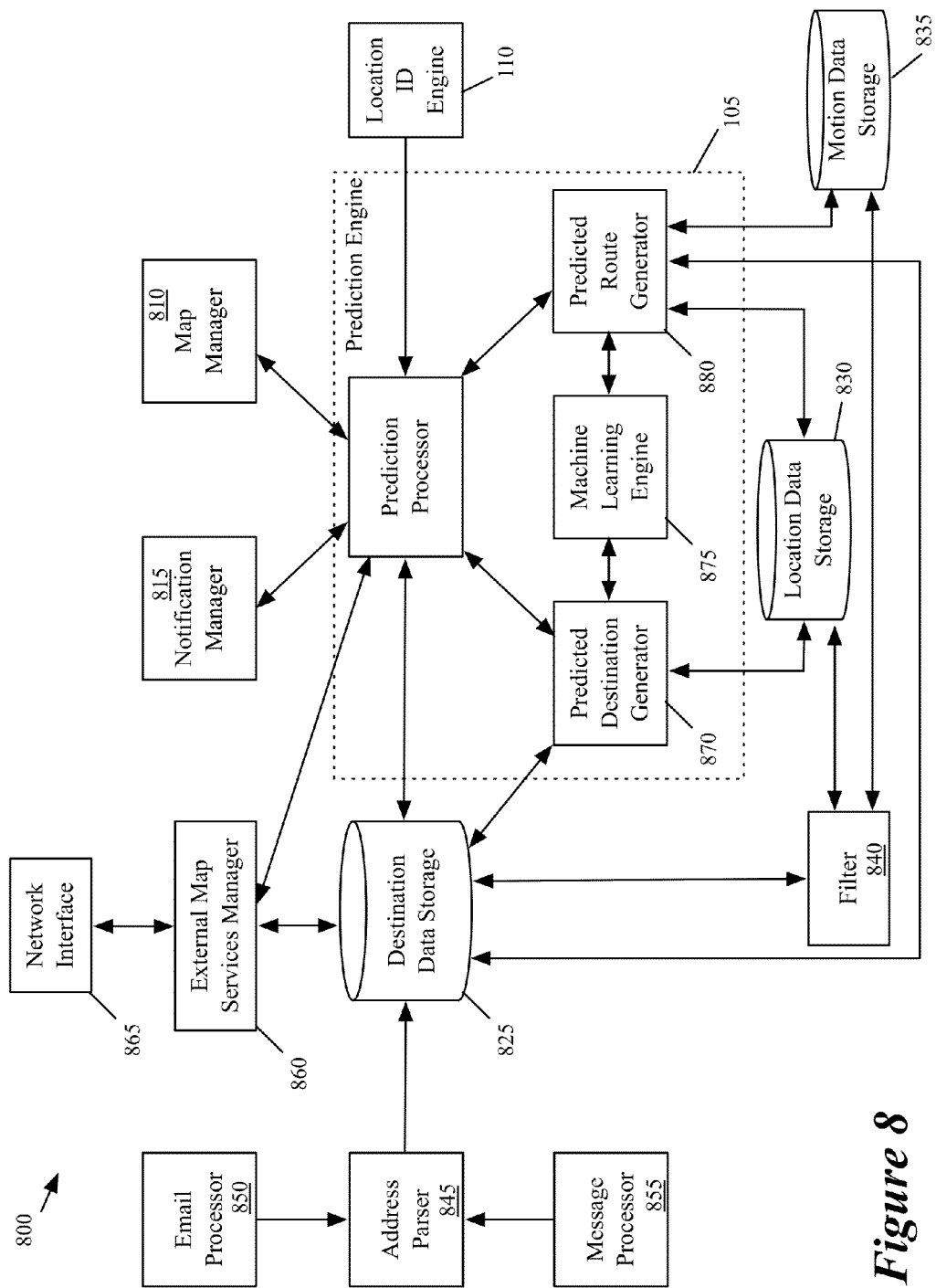
FIG. 8 illustrates a detailed block diagram of the route prediction architecture of the mobile device of some embodiments of the invention.

FIG. 8 illustrates a more detailed block diagram of the route prediction architecture of the mobile device 800 of some embodiments of the invention. In some embodiments, the mobile device is a smartphone or a tablet computer with location identification, mapping and routing services. FIG. 8 illustrates the mobile device's map manager 810 that performs the map output functions described above by reference to FIGS. 2-5, based on the destination/route data predicted by the device's route prediction engine 105. It also illustrates the device's notification manager 815 that perform the notification functions described above by reference to FIGS. 6 and 7, based on the predicted data.

In addition to the route prediction engine 105, the map manager 810 and the notification manager 815, the device 800 also includes a location identification engine 110, a route history data storage (e.g., database) 825, a location data storage 830, motion data storage 835, a data storage filter 840, an address parser 845, email and message processors 850 and 855, an external map service manager 860 and a network interface 865. This device includes a number of other modules (e.g., a system clock) that are not shown here in order to not obscure the description of this device with unnecessary detail.

The data storages 825, 830 and 835 store user-specific travel data that the route prediction engine 105 uses (1) to formulate predictions about current or future destinations and/or routes to such destinations for the device's user, and (2) to provide this information to the notification manager 815 and the map manager 810 in order to relay relevant information to the user. The user-specific data is different in different embodiments. In some embodiments, the destination data storage 825 stores data about previous destinations traveled to by the user, and addresses parsed from recent e-mails and/or messages sent to the user. The address parser 845 (1) examines new emails and messages received from the email and message processors 850 and 855 to identify and parse addresses in these emails and messages, (2) for each extracted address, determines whether the address is stored in the destination storage 825 already, and (3) stores each new address (that was not previously stored in the storage 825) in the destination storage 825. In some embodiments, the address parser 845 uses known techniques to identify and parse addresses in these messages (i.e., the techniques that enable devices to make addresses selectable within an e-mail or message).

The location data storage 830 in some embodiments stores locations along routes that the device previously traveled (e.g., GPS coordinates of the device at intervals of time along a route). The motion data storage 835 in some embodiments stores travel speeds of the device along previously traveled routes. In some embodiments, this includes the travel speeds for one or more locations stored in the location data storage 830 (e.g., the speed at each of the GPS coordinates, or speed traveled between two coordinates). The filter 840 periodically examines the destination, location and motion data stored in the storages 825, 830 and 835, and removes any data that is "stale." In some embodiments, the filter's criterion for staleness is expressed in terms of the age of the data and the frequency of its use in predicting new destinations and/or new routes. Also, in some embodiments, the filter uses different criteria for measuring the staleness of different types of data. For instance, some embodiments filter parsed address data (provided by the address parser 845) that is older than a certain number of days (e.g., one day), while filtering destination, location and motion data related to previous routes of the device based on the age of the data and its frequency of use.

Together, the route prediction engine uses the destination, location and motion data stored in the data storages 825, 830 and 835, along with additional inputs such as the system clock and location identification engine 110, to identify predicted destinations and routes between these destinations. The route prediction engine 105 periodically performs automated processes that formulate predictions about current or future destinations of the device and/or formulate routes to such destinations for the device. Based on these formulations, this engine then directs the notification manager 815 and the map manager 810 to relay relevant information to the user.

The prediction engine 105 includes a prediction processor 807, a predicted destination generator 870, a machine learning engine 875 and a predicted route generator 880. The prediction processor 807 is responsible for initiating the periodic automated processing of the engine, and serves as the central unit for coordinating much of the operations of the prediction engine.

In different embodiments, the prediction processor 807 initiates the automated processes with different frequencies. For instance, to identify possible patterns of travel, it runs these processes once a day in some embodiment, several times a day in other embodiments, several times an hour in yet other embodiments, and several times a minute in still other embodiments. In some embodiments, the prediction processor 807 initiates the automated process on a particular schedule (e.g., once per day) and additionally initiates the process when something changes (e.g., when a user adds an address to a calendar event or when something is added to a history). In some embodiments, the prediction processor 807 runs less frequently when the device is running on battery power than when it is plugged in to an external power source. In addition, some embodiments perform the automated prediction processes more frequently upon detection that the device is traveling along a road or at a speed above a particular threshold generally associated with motor vehicles (e.g., 20 mph, 30 mph, etc.). Furthermore, some embodiments allow the user of the device to configure how often or how aggressively the route prediction engine should perform its automated processes.

Whenever the prediction processor 807 initiates a route prediction operation, it directs the predicted destination generator 870 to generate a complete list of possible destinations based on previous route destinations and parsed new address locations stored in the destination data storage 825. In some embodiments, the prediction destination generator uses the machine-learning engine 875 to create a more complete set of possible destinations for a particular location of the device (as specified by the location identification engine 110) for a particular time interval on a particular day. Various machine-learning engines can be used to perform such a task. In general, machine-learning engines can formulate a solution to a problem expressed in terms of a set of known input variables and a set of unknown output variables by taking previously solved problems (expressed in terms of known input and output variables) and extrapolating values for the unknown output variables of the current problem. In the case of generating a more complete set of possible destinations for a particular time interval on a particular day, the machine-learning engine is used to filter the stored route destinations and augment this set based on addresses parsed by the parser 845.

In some embodiments, the machine-learning engine 875 not only facilitates the formulation of predicted future destinations, but it also facilitates the formulation of predicted routes to destinations based on the destination, location, and motion histories that are stored in the data storages 825, 830 and 835. For instance, in some embodiments, the prediction route generator 880 uses the machine-learning engine to create sets of associated destinations, with each set specified as a possible route for traveling. In some embodiments, each set of associated destinations includes start and end locations (which are typically called route destinations or endpoints), a number of locations in between the start and end locations, and a number of motion records specifying rate of travel (e.g., between the locations). In some embodiments, the predicted route generator uses the machine-learning engine to stitch together previously unrelated destination, location, and motion records into contiguous sets that specify potential routes. In some embodiments, the destination history includes both addresses that are received as explicit addresses (e.g., addresses input by the user or received in an e-mail) as well as additional destinations derived from previous locations in the location history of the device (e.g., the location data storage 830).

In some embodiments, the location history is used to predict both destinations and routes. By identifying locations at which the device stopped traveling (or at least stopped traveling at motor vehicle speeds), and subsequently stayed within locations associated with a single address for at least a threshold amount of time, the predicted destination generator can extrapolate possible destinations from the location data 830. However, this use of the motion history may occasionally lead to false positives for destinations (e.g., when the user is stuck in a major traffic jam). Accordingly, some embodiments also identify (through an interface with a vehicle to which the device connects) that the vehicle has been turned off and/or that subsequent motion is at low speed (in terms of change of location coordinates) and follows a movement (e.g., based on accelerometer data) associated with leaving the interior of a vehicle (e.g., small-scale movement associated with walking) Also, in some embodiments, the route generator through the prediction processor 807 provides each of the sets of records that it generates to an external routing engine outside of the device so that the external routing service can generate the route for each generated set of associated records. To communicate with the external routing engine, the prediction processor 807 uses the external map service manager 860, which through the network interface 865 and a network (e.g., a wireless network) communicatively couples to the device and the external map service. One such approach will further described below by reference to FIG. 9. In other embodiments, the prediction route generator itself generates the route for each set of associated records.

Once the route generator 880 has one or more specified predicted routes, the prediction processor 807 supplies the generated set of predicted routes and/or metadata information about these routes to the notification manager 815 and the map manager 810 for relay of one or more relevant pieces of route information to the user of the device. For instance, based on the predicted destination/route data supplied by the device's route prediction engine 105, the map manager 810 performs the map output functions described above by reference to FIGS. 2-5, while the notification manager 815 that perform the notification functions described above by reference to FIGS. 6 and 7, in some embodiments of the invention. In addition, in some embodiments, the map manager 810 may provide information to the notification manager (e.g., traffic information) or vice versa.

In the example illustrated in FIG. 8, the device's route prediction engine 105 only relies on user-specific data stored on the device in some embodiments. However, in other embodiments, this engine can also based its operations on user-specific data that is identified outside of the device by external devices/servers.

Figure 9:
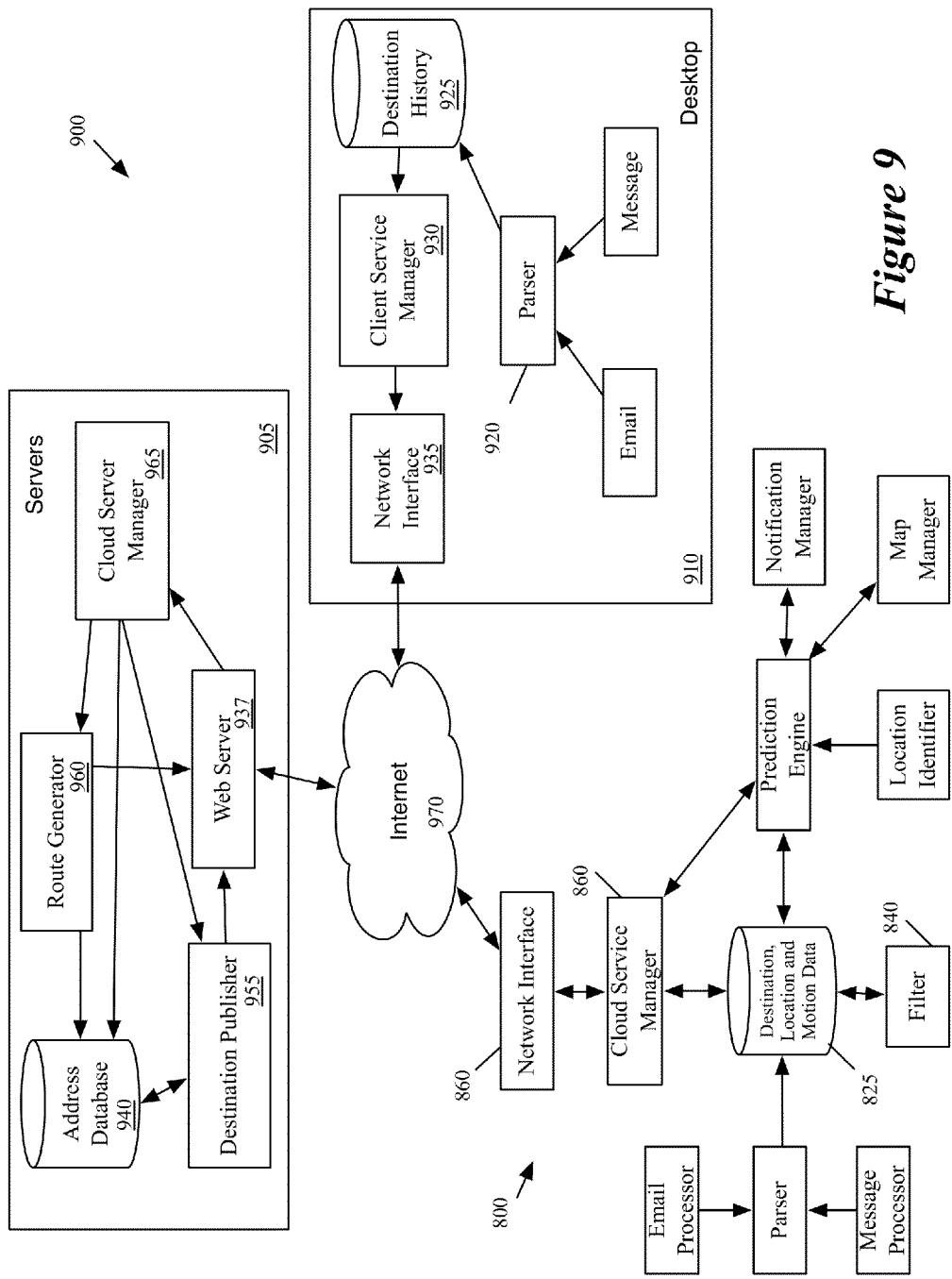
FIG. 9 illustrates an approach for utilizing externally gathered data to help generate predicted destination data.

FIG. 9 illustrates one such approach for utilizing externally gathered data to help generate predicted destination data. This figure also provides an example of an external route generation service that the device 800 can use to generate its predicted routes. This figure illustrates a system 900 that includes the device 800, a set of servers 905 and a desktop computer 910. While shown as a desktop, one of ordinary skill in the art will recognize that this may be a laptop or other computer as well. The server set 905 is a collection of one or more servers that provide a cloud synchronization service for synchronizing certain services (e.g., email, contact, calendar, document, etc.) across all the devices/computers of a user. Numerous users can subscribe to this service to synchronize the content on each of their own devices/computers.

The computer 910 is associated with the device 800, e.g., belongs to the same cloud synchronization account as the device 800. This computer includes an address parser 920 with similar functionality to the address parser 845 of FIG. 8. This parser identifies and extracts new address locations in recent e-mails and/or messages sent to the user, and stores the extracted locations in the destination database 925.

The computer 910 also has client service manager 930 and network interface 935 that push any newly stored locations to an address data storage 940 in the server set 905 for the account associated with the device 800 and the computer 910. In some embodiments, the server set 905 communicatively couples to the device 800 and the computer 910 through the Internet 970. Accordingly, in these embodiments, the servers have one or more web servers 937 that facilitate communications between the back-end servers and the device or the computer.

The servers 905 include a cloud service manager 965 that coordinates all communication that it receives from the device 800 and the computer 910. It also has an address data storage 940 that stores addresses parsed by the parsers 845 and 920 as well as locations searched in the device and the computer. In some embodiments, the storage 940 also stores previous destinations and/or previous locations traveled by the user of the device. In other embodiments, however, information about the user's previous destinations and/or locations are not stored in the address data storage in order to respect and maintain the privacy of the user. To the extent that addresses are stored in the storage 940 in some embodiments, the storage 940 stores the addresses in an encrypted manner so that only keys residing on the device or the desktop can decrypt and gain access to such address data.

After storing any newly parsed address that it receives in the data storage 940, the cloud service manager 965 directs a destination publisher 955 to publish this address to any device or computer associated with the same synchronization account as the computer 910. Accordingly, this newly parsed data will get pushed by the publisher to the destination storage 825 through the web server 937, the Internet, the network interface 865 and the external map service manager 860. Once the data is in this storage 825, the route prediction engine 105 can use it to formulate its predicted destinations.

In some embodiments, the servers have one or more filters for filtering out stale data in the address data storage 940. The servers also include a route generator 960, which is the engine used by the device's route prediction engine 105 to generate one or more routes for each set of destination, location and/or moving record that the engine 105 provides to it for route generation. In some embodiments, each module of the server set 905 that is shown as a single block might be implemented by one or more computers dedicated to the particular task of the module. Alternatively, or conjunctively, two or more modules of the server set might execute on the same computer. Furthermore, the different functionalities performed by the set of servers might be performed in disparate geographic locations (e.g., a set of servers at one location for the route generation with the address database stored at a different location). In some embodiments, the route generation function might be performed by servers belonging to a first organization, while a second organization stores the addresses in its cloud storage, with communication between the two organization either performed directly or through the device 800 as an intermediary.

Figure 10:
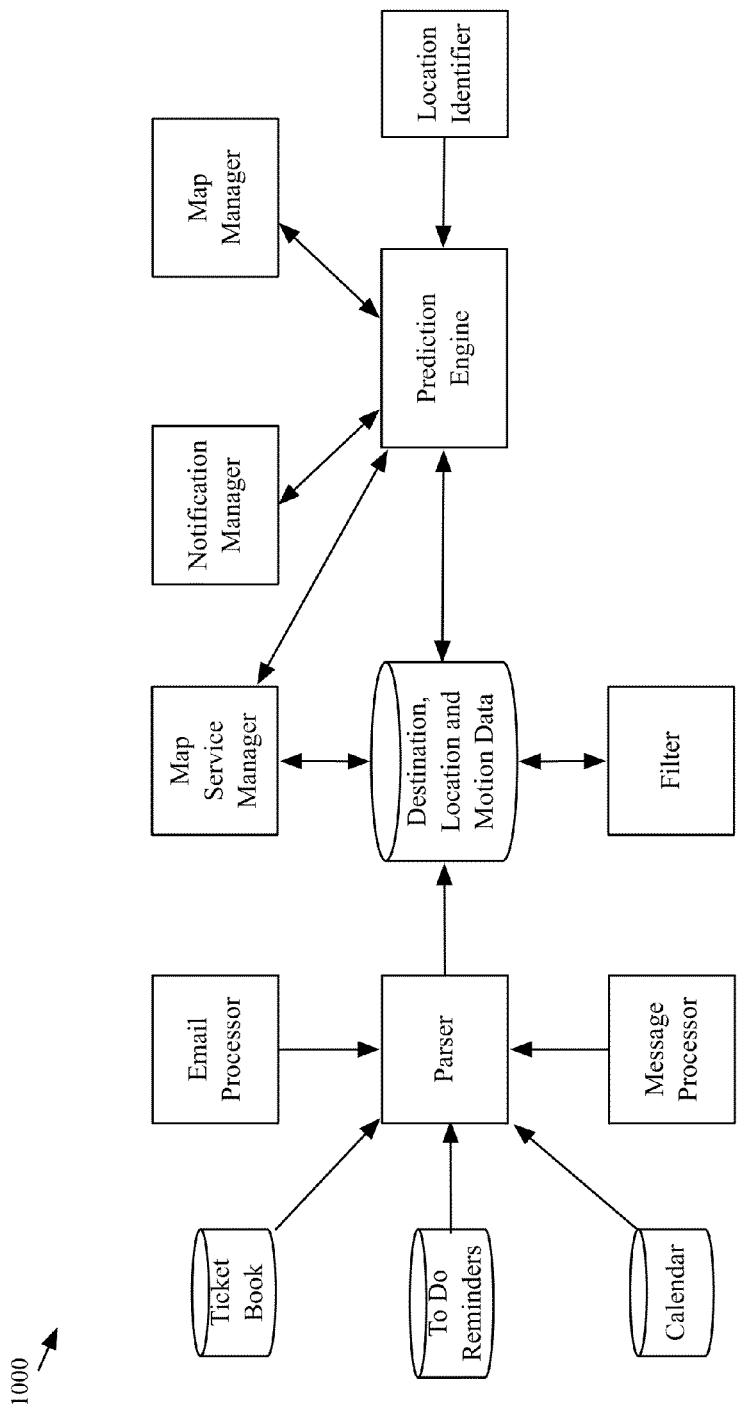
FIG. 10 illustrates a device that is similar to the device of FIG. 8 except that its address parser also examines the ticket book, reminder, and calendar databases of the device to identify and extract new addresses to include in the destination data storage of the device.

In addition to parsing emails and messages to identify possible destination locations, the device of some embodiments examines other secondary sources to identify other potential destinations. Examples of such other candidate destinations include locations of calendared events in the user's calendar, locations of events for which the user has electronic tickets, and locations associated with reminders. FIG. 10 illustrates a device 1000 that is similar to the device 800 except that its address parser 845 also examines the ticket book, reminder, and calendar databases of the device to identify and extract new addresses to include in the destination data storage of the device. In some embodiments, such parsing of calendar, reminder and ticket data is performed on each device or computer of the user that is associated with a cloud synchronization account and any newly identified address is pushed to each device or computer associated with the account.

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 11:
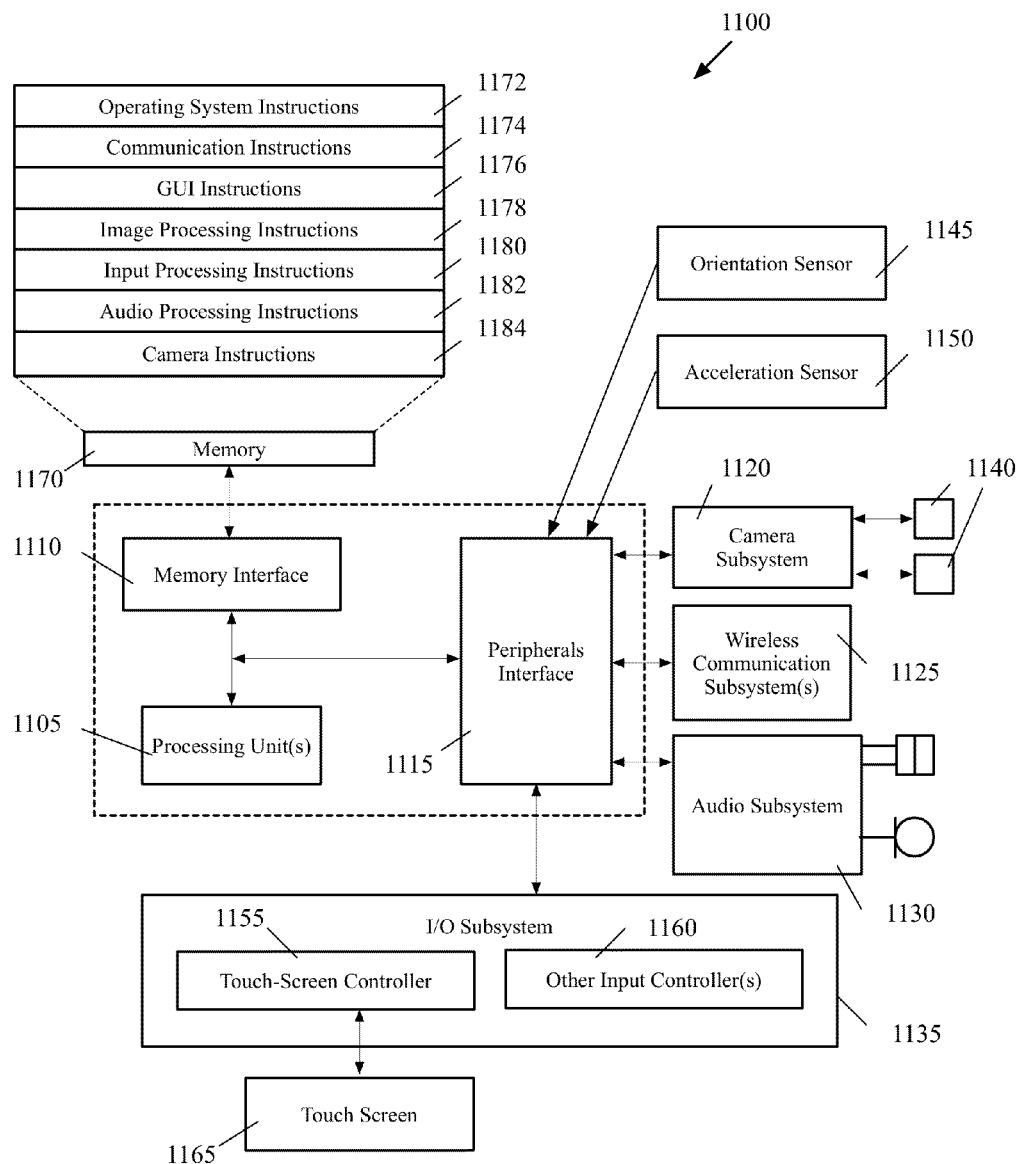
FIG. 11 conceptually illustrates an example of an architecture of a mobile computing device on which some embodiments of the invention are implemented.

The mapping and navigation applications of some embodiments operate on mobile devices, such as smart phones (e.g., iPhones®) and tablets (e.g., iPads®). FIG. 11 is an example of an architecture 1100 of such a mobile computing device. Examples of mobile computing devices include smartphones, tablets, laptops, etc. As shown, the mobile computing device 1100 includes one or more processing units 1105, a memory interface 1110 and a peripherals interface 1115.

The peripherals interface 1115 is coupled to various sensors and subsystems, including a camera subsystem 1120, a wireless communication subsystem(s) 1125, an audio subsystem 1130, an I/O subsystem 1135, etc. The peripherals interface 1115 enables communication between the processing units 1105 and various peripherals. For example, an orientation sensor 1145 (e.g., a gyroscope) and an acceleration sensor 1150 (e.g., an accelerometer) is coupled to the peripherals interface 1115 to facilitate orientation and acceleration functions.

The camera subsystem 1120 is coupled to one or more optical sensors 1140 (e.g., a charged coupled device (CCD) optical sensor, a complementary metal-oxide-semiconductor (CMOS) optical sensor, etc.). The camera subsystem 1120 coupled with the optical sensors 1140 facilitates camera functions, such as image and/or video data capturing. The wireless communication subsystem 1125 serves to facilitate communication functions. In some embodiments, the wireless communication subsystem 1125 includes radio frequency receivers and transmitters, and optical receivers and transmitters (not shown in FIG. 11). These receivers and transmitters of some embodiments are implemented to operate over one or more communication networks such as a GSM network, a Wi-Fi network, a Bluetooth network, etc. The audio subsystem 1130 is coupled to a speaker to output audio (e.g., to output voice navigation instructions). Additionally, the audio subsystem 1130 is coupled to a microphone to facilitate voice-enabled functions, such as voice recognition (e.g., for searching), digital recording, etc.

The I/O subsystem 1135 involves the transfer between input/output peripheral devices, such as a display, a touch screen, etc., and the data bus of the processing units 1105 through the peripherals interface 1115. The I/O subsystem 1135 includes a touch-screen controller 1155 and other input controllers 1160 to facilitate the transfer between input/output peripheral devices and the data bus of the processing units 1105. As shown, the touch-screen controller 1155 is coupled to a touch screen 1165. The touch-screen controller 1155 detects contact and movement on the touch screen 1165 using any of multiple touch sensitivity technologies. The other input controllers 1160 are coupled to other input/control devices, such as one or more buttons. Some embodiments include a near-touch sensitive screen and a corresponding controller that can detect near-touch interactions instead of or in addition to touch interactions.

The memory interface 1110 is coupled to memory 1170. In some embodiments, the memory 1170 includes volatile memory (e.g., high-speed random access memory), non-volatile memory (e.g., flash memory), a combination of volatile and non-volatile memory, and/or any other type of memory. As illustrated in FIG. 11, the memory 1170 stores an operating system (OS) 1172. The OS 1172 includes instructions for handling basic system services and for performing hardware dependent tasks.

The memory 1170 also includes communication instructions 1174 to facilitate communicating with one or more additional devices; graphical user interface instructions 1176 to facilitate graphic user interface processing; image processing instructions 1178 to facilitate image-related processing and functions; input processing instructions 1180 to facilitate input-related (e.g., touch input) processes and functions; audio processing instructions 1182 to facilitate audio-related processes and functions; and camera instructions 1184 to facilitate camera-related processes and functions. The instructions described above are merely exemplary and the memory 1170 includes additional and/or other instructions in some embodiments. For instance, the memory for a smartphone may include phone instructions to facilitate phone-related processes and functions. Additionally, the memory may include instructions for a mapping and navigation application as well as other applications. The above-identified instructions need not be implemented as separate software programs or modules. Various functions of the mobile computing device can be implemented in hardware and/or in software, including in one or more signal processing and/or application specific integrated circuits.

While the components illustrated in FIG. 11 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 11 may be split into two or more integrated circuits.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such machine-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The machine-readable media may store a program that is executable by at least one processing unit and includes sets of instructions for performing various operations. Examples of programs or code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs), customized ASICs or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

Figure 12:
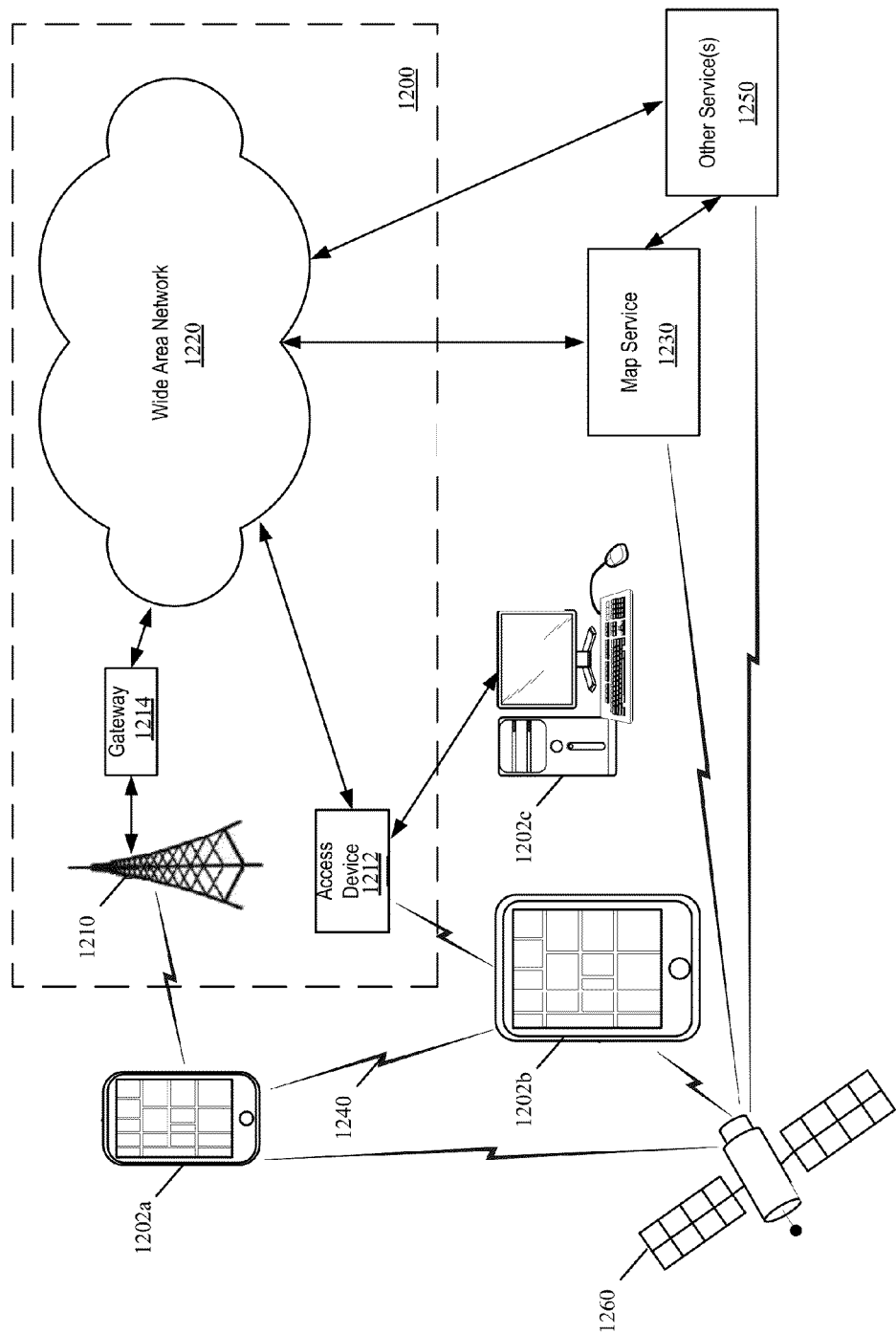
FIG. 12 conceptually illustrates a map service operating environment according to some embodiments.

As mentioned above, various embodiments may operate within a map service operating environment. FIG. 12 illustrates a map service operating environment, according to some embodiments. A map service 1230 (also referred to as mapping service) may provide map services for one or more client devices 1202a-1202c in communication with the map service 1230 through various communication methods and protocols. A map service 1230 in some embodiments provides map information and other map-related data, such as two-dimensional map image data (e.g., aerial view of roads utilizing satellite imagery), three-dimensional map image data (e.g., traversable map with three-dimensional features, such as buildings), route and direction calculation (e.g., ferry route calculations or directions between two points for a pedestrian), real-time navigation data (e.g., turn-by-turn visual navigation data in two or three dimensions), location data (e.g., where is the client device currently located), and other geographic data (e.g., wireless network coverage, weather, traffic information, or nearby points-of-interest). In various embodiments, the map service data may include localized labels for different countries or regions; localized labels may be utilized to present map labels (e.g., street names, city names, points of interest) in different languages on client devices. Client devices 1202a-1202c may utilize these map services by obtaining map service data. Client devices 1202a-1202c may implement various techniques to process map service data. Client devices 1202a-1202c may then provide map services to various entities, including, but not limited to, users, internal software or hardware modules, and/or other systems or devices external to the client devices 1202a-1202c.

In some embodiments, a map service is implemented by one or more nodes in a distributed computing system. Each node may be assigned one or more services or components of a map service. Some nodes may be assigned the same map service or component of a map service. A load balancing node in some embodiments distributes access or requests to other nodes within a map service. In some embodiments a map service is implemented as a single system, such as a single server. Different modules or hardware devices within a server may implement one or more of the various services provided by a map service.

A map service in some embodiments provides map services by generating map service data in various formats. In some embodiments, one format of map service data is map image data. Map image data provides image data to a client device so that the client device may process the image data (e.g., rendering and/or displaying the image data as a two-dimensional or three-dimensional map). Map image data, whether in two or three dimensions, may specify one or more map tiles. A map tile may be a portion of a larger map image. Assembling together the map tiles of a map produces the original map. Tiles may be generated from map image data, routing or navigation data, or any other map service data. In some embodiments map tiles are raster-based map tiles, with tile sizes ranging from any size both larger and smaller than a commonly-used 256 pixel by 256 pixel tile. Raster-based map tiles may be encoded in any number of standard digital image representations including, but not limited to, Bitmap (.bmp), Graphics Interchange Format (.gif), Joint Photographic Experts Group (.jpg, .jpeg, etc.), Portable Networks Graphic (.png), or Tagged Image File Format (.tiff). In some embodiments, map tiles are vector-based map tiles, encoded using vector graphics, including, but not limited to, Scalable Vector Graphics (.svg) or a Drawing File (.drw). Some embodiments also include tiles with a combination of vector and raster data. Metadata or other information pertaining to the map tile may also be included within or along with a map tile, providing further map service data to a client device. In various embodiments, a map tile is encoded for transport utilizing various standards and/or protocols, some of which are described in examples below.

In various embodiments, map tiles may be constructed from image data of different resolutions depending on zoom level. For instance, for low zoom level (e.g., world or globe view), the resolution of map or image data need not be as high relative to the resolution at a high zoom level (e.g., city or street level). For example, when in a globe view, there may be no need to render street level artifacts as such objects would be so small as to be negligible in many cases.

A map service in some embodiments performs various techniques to analyze a map tile before encoding the tile for transport. This analysis may optimize map service performance for both client devices and a map service. In some embodiments map tiles are analyzed for complexity, according to vector-based graphic techniques, and constructed utilizing complex and non-complex layers. Map tiles may also be analyzed for common image data or patterns that may be rendered as image textures and constructed by relying on image masks. In some embodiments, raster-based image data in a map tile contains certain mask values, which are associated with one or more textures. Some embodiments also analyze map tiles for specified features that may be associated with certain map styles that contain style identifiers.

Other map services generate map service data relying upon various data formats separate from a map tile in some embodiments. For instance, map services that provide location data may utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Embodiments may also receive or request data from client devices identifying device capabilities or attributes (e.g., hardware specifications or operating system version) or communication capabilities (e.g., device communication bandwidth as determined by wireless signal strength or wire or wireless network type).

A map service may obtain map service data from internal or external sources. For example, satellite imagery used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

Various embodiments of a map service may respond to client device requests for map services. These requests may be a request for a specific map or portion of a map. Some embodiments format requests for a map as requests for certain map tiles. In some embodiments, requests also supply the map service with starting locations (or current locations) and destination locations for a route calculation. A client device may also request map service rendering information, such as map textures or style sheets. In at least some embodiments, requests are also one of a series of requests implementing turn-by-turn navigation. Requests for other geographic data may include, but are not limited to, current location, wireless network coverage, weather, traffic information, or nearby points-of-interest.

A map service, in some embodiments, analyzes client device requests to optimize a device or map service operation. For instance, a map service may recognize that the location of a client device is in an area of poor communications (e.g., weak wireless signal) and send more map service data to supply a client device in the event of loss in communication or send instructions to utilize different client hardware (e.g., orientation sensors) or software (e.g., utilize wireless location services or Wi-Fi positioning instead of GPS-based services). In another example, a map service may analyze a client device request for vector-based map image data and determine that raster-based map data better optimizes the map image data according to the image's complexity. Embodiments of other map services may perform similar analysis on client device requests and as such the above examples are not intended to be limiting.

Various embodiments of client devices (e.g., client devices 1202a-1202c) are implemented on different portable-multifunction device types. Client devices 1202a-1202c utilize map service 1230 through various communication methods and protocols. In some embodiments, client devices 1202a-1202c obtain map service data from map service 1230. Client devices 1202a-1202c request or receive map service data. Client devices 1202a-1202c then process map service data (e.g., render and/or display the data) and may send the data to another software or hardware module on the device or to an external device or system.

A client device, according to some embodiments, implements techniques to render and/or display maps. These maps may be requested or received in various formats, such as map tiles described above. A client device may render a map in two-dimensional or three-dimensional views. Some embodiments of a client device display a rendered map and allow a user, system, or device providing input to manipulate a virtual camera in the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. For instance, a client device may be tilted up from its current position to manipulate the virtual camera to rotate up. In another example, a client device may be tilted forward from its current position to move the virtual camera forward. Other input devices to the client device may be implemented including, but not limited to, auditory input (e.g., spoken words), a physical keyboard, mouse, and/or a joystick.

Some embodiments provide various visual feedback to virtual camera manipulations, such as displaying an animation of possible virtual camera manipulations when transitioning from two-dimensional map views to three-dimensional map views. Some embodiments also allow input to select a map feature or object (e.g., a building) and highlight the object, producing a blur effect that maintains the virtual camera's perception of three-dimensional space.

In some embodiments, a client device implements a navigation system (e.g., turn-by-turn navigation). A navigation system provides directions or route information, which may be displayed to a user. Some embodiments of a client device request directions or a route calculation from a map service. A client device may receive map image data and route data from a map service. In some embodiments, a client device implements a turn-by-turn navigation system, which provides real-time route and direction information based upon location information and route information received from a map service and/or other location system, such as Global Positioning Satellite (GPS). A client device may display map image data that reflects the current location of the client device and update the map image data in real-time. A navigation system may provide auditory or visual directions to follow a certain route.

A virtual camera is implemented to manipulate navigation map data according to some embodiments. Some embodiments of client devices allow the device to adjust the virtual camera display orientation to bias toward the route destination. Some embodiments also allow virtual camera to navigation turns simulating the inertial motion of the virtual camera.

Client devices implement various techniques to utilize map service data from map service. Some embodiments implement some techniques to optimize rendering of two-dimensional and three-dimensional map image data. In some embodiments, a client device locally stores rendering information. For instance, a client stores a style sheet which provides rendering directions for image data containing style identifiers. In another example, common image textures may be stored to decrease the amount of map image data transferred from a map service. Client devices in different embodiments implement various modeling techniques to render two-dimensional and three-dimensional map image data, examples of which include, but are not limited to: generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data. Some embodiments of client devices also order or prioritize map service data in certain techniques. For instance, a client device detects the motion or velocity of a virtual camera, which if exceeding certain threshold values, lower-detail image data is loaded and rendered of certain areas. Other examples include: rendering vector-based curves as a series of points, preloading map image data for areas of poor communication with a map service, adapting textures based on display zoom level, or rendering map image data according to complexity.

In some embodiments, client devices communicate utilizing various data formats separate from a map tile. For instance, some client devices implement Assisted Global Positioning Satellites (A-GPS) and communicate with location services that utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Client devices may also receive GPS signals directly. Embodiments may also send data, with or without solicitation from a map service, identifying the client device's capabilities or attributes (e.g., hardware specifications or operating system version) or communication capabilities (e.g., device communication bandwidth as determined by wireless signal strength or wire or wireless network type).

FIG. 12 illustrates one possible embodiment of an operating environment 1200 for a map service 1230 and client devices 1202a-1202c. In some embodiments, devices 1202a, 1202b, and 1202c communicate over one or more wire or wireless networks 1210. For example, wireless network 1210, such as a cellular network, can communicate with a wide area network (WAN) 1220, such as the Internet, by use of gateway 1214. A gateway 1214 in some embodiments provides a packet oriented mobile data service, such as General Packet Radio Service (GPRS), or other mobile data service allowing wireless networks to transmit data to other networks, such as wide area network 1220. Likewise, access device 1212 (e.g., IEEE 802.11 g wireless access device) provides communication access to WAN 1220. Devices 1202a and 1202b can be any portable electronic or computing device capable of communicating with a map service. Device 1202c can be any non-portable electronic or computing device capable of communicating with a map service.

In some embodiments, both voice and data communications are established over wireless network 1210 and access device 1212. For instance, device 1202a can place and receive phone calls (e.g., using voice over Internet Protocol (VoIP) protocols), send and receive e-mail messages (e.g., using Simple Mail Transfer Protocol (SMTP) or Post Office Protocol 3 (POP3)), and retrieve electronic documents and/or streams, such as web pages, photographs, and videos, over wireless network 1210, gateway 1214, and WAN 1220 (e.g., using Transmission Control Protocol/Internet Protocol (TCP/IP) or User Datagram Protocol (UDP)). Likewise, in some implementations, devices 1202b and 1202c can place and receive phone calls, send and receive e-mail messages, and retrieve electronic documents over access device 1212 and WAN 1220. In various embodiments, any of the illustrated client device may communicate with map service 1230 and/or other service(s) 1250 using a persistent connection established in accordance with one or more security protocols, such as the Secure Sockets Layer (SSL) protocol or the Transport Layer Security (TLS) protocol.

Devices 1202a and 1202b can also establish communications by other means. For example, wireless device 1202a can communicate with other wireless devices (e.g., other devices 1202b, cell phones, etc.) over the wireless network 1210. Likewise devices 1202a and 1202b can establish peer-to-peer communications 1240 (e.g., a personal area network) by use of one or more communication subsystems, such as Bluetooth® communication from Bluetooth Special Interest Group, Inc. of Kirkland, Wash. Device 1202c can also establish peer to peer communications with devices 1202a or 1202b (not shown). Other communication protocols and topologies can also be implemented. Devices 1202a and 1202b may also receive Global Positioning Satellite (GPS) signals from GPS satellites 1260.

Devices 1202a, 1202b, and 1202c can communicate with map service 1230 over the one or more wire and/or wireless networks, 1210 or 1212. For instance, map service 1230 can provide a map service data to rendering devices 1202a, 1202b, and 1202c. Map service 1230 may also communicate with other services 1250 to obtain data to implement map services. Map service 1230 and other services 1250 may also receive GPS signals from GPS satellites 1260.

In various embodiments, map service 1230 and/or other service(s) 1250 are configured to process search requests from any of client devices. Search requests may include but are not limited to queries for business, address, residential locations, points of interest, or some combination thereof. Map service 1230 and/or other service(s) 1250 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria include but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 1230 and/or other service(s) 1250 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 1230 and/or other service(s) 1250, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 1230 and/or other service(s) 1250 provide one or more feedback mechanisms to receive feedback from client devices 1202a-1202c. For instance, client devices may provide feedback on search results to map service 1230 and/or other service(s) 1250 (e.g., feedback specifying ratings, reviews, temporary or permanent business closures, errors etc.); this feedback may be used to update information about points of interest in order to provide more accurate or more up-to-date search results in the future. In some embodiments, map service 1230 and/or other service(s) 1250 may provide testing information to the client device (e.g., an A/B test) to determine which search results are best. For instance, at random intervals, the client device may receive and present two search results to a user and allow the user to indicate the best result. The client device may report the test results to map service 1230 and/or other service(s) 1250 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). Thus, one of ordinary skill in the art would understand that the invention is not to be limited by the foregoing illustrative details, but rather is to be defined by the appended claims.

The invention claimed is:

1. A mobile device comprising:
a location identification engine for identifying a location of the device;
an interface for receiving addresses from a set of other devices associated with the device through a network;
a data storage for storing past locations of the device and addresses received from the set of other devices;
a prediction engine for predicting future destinations of the device based on the stored past locations of the device and addresses received from the set of other devices; and
a set of processing units for executing the location identification engine and the prediction engine.

2. The mobile device of claim 1, wherein the addresses received from the set of other devices comprises a set of addresses harvested by a device of the set of other devices.

3. The mobile device of claim 1, wherein the mobile device is associated with a particular user and the set of other devices are also associated with the particular user.

4. The mobile device of claim 1 further comprising a calendar and at least one electronic messaging program, wherein the data storage is further for storing data regarding locations of calendared events in the calendar, and addresses parsed from electronic messages received by the electronic messaging program.

5. The mobile device of claim 4, wherein the electronic messaging program is at least one of an email program or a text messaging program.

6. The mobile device of claim 1, wherein the past locations comprise destinations of past routes traversed by the device.

7. The mobile device of claim 1, wherein the past locations comprise locations along past routes traversed by the device.

8. A mobile device comprising:
a location identification engine for identifying a location of the device;
an electronic ticket application;
a data storage for storing past locations of the device and data regarding a location of an event for which the electronic ticket application has a ticket;
a prediction engine for predicting future destinations of the device; and
a set of processing units for executing the location identification engine and the prediction engine.

9. The mobile device of claim 1, wherein the set of other devices comprises a desktop computer and the addresses received from the desktop computer comprise a set of addresses harvested from applications that execute on the desktop computer.

10. The mobile device of claim 1, wherein the mobile device and the set of other devices are part of a group of devices that synchronize their content through a network-based synchronization system, wherein the received addresses are addresses extracted by at least one other device that is part of the group.

11. The mobile device of claim 1 further comprising a map application that generates a map display, receives data regarding a predicted destination from the prediction engine, and displays the predicted destination on the map display.

12. The mobile device of claim 1 further comprising a map application for generating a map display, wherein the prediction engine is further for formulating routes to predicted destinations and providing the routes to the map application, wherein the map application is further for displaying the predicted destination on the map display.

13. The mobile device of claim 12, wherein the prediction engine comprises a machine-learning engine for formulating predicted future destinations and future routes to the predicted future destinations.

14. A non-transitory machine readable medium storing a program for providing information about potential destinations to which a device may travel, the program for execution by at least one processing unit, the program comprising sets of instructions for:
identifying a location of the device;
storing past locations of the device and event location data regarding locations of events for which an electronic ticket application has a ticket, the electronic ticket application for maintaining electronic tickets for events;
predicting at least one future destination of the device based on the stored past locations and the event location data; and
providing an output based on the predicted destination.

15. The non-transitory machine readable medium of claim 14, wherein the program further comprises a set of instructions for formulating a route to the predicted destination.

16. The non-transitory machine readable medium of claim 14, wherein the program further comprises sets of instruction for:
- extracting locations of calendared events stored by a calendar application on the device and extracting addresses contained in electronic messages received by the device; and
- using the extracted locations and addresses along with the stored past locations and event location data to predict the future destination.

17. The non-transitory machine readable medium of claim 14, wherein the program further comprises sets of instructions for:
- receiving addresses from a set of other devices associated with the device through a network; and
- using the received addresses along with the stored past locations and event location data to predict the future destination.

18. The non-transitory machine readable medium of claim 14, wherein the past locations comprise locations along past routes traversed by the device.

19. The non-transitory machine readable medium of claim 14, wherein the past locations comprise past destinations of the device.

20. A non-transitory machine readable medium storing a program for providing information about potential destinations that a device may travel to, the program for execution by at least one processing unit, the program comprising sets of instructions for:
- identifying a location of the device;
- receiving addresses from a set of other devices associated with the device through a network;
- storing past locations of the device and the addresses received from the set of other devices;
- predicting at least one future destination of the device based on the stored, past locations and the addresses received from the set of other devices; and
- providing an output based on the predicted destination.

21. The non-transitory machine readable medium of claim 20, wherein the program further comprises sets of instructions for:
- extracting locations of calendared events stored by a calendar application on the device and extracting addresses contained in electronic messages received by the device; and
- using the extracted locations and addresses along with the stored past locations and event location data to predict the future destination.

22. The non-transitory machine readable medium of claim 20, wherein the program further comprises a set of instructions for:
- generating a map display;
- receiving data regarding a predicted destination from the prediction engine; and
- displaying the predicted destination on the map display.

23. The non-transitory machine readable medium of claim 20, wherein the device and the set of other devices are part of a group of devices that synchronize content.

24. The mobile device of claim 8 further comprising a map application that generates a map display, receives data regarding a predicted destination from the prediction engine, and displays the predicted destination on the map display.

25. The mobile device of claim 8 further comprising a map application for generating a map display, wherein the prediction engine is further for formulating routes to predicted destinations and providing the routes to the map application, wherein the map application is further for displaying the predicted destination on the map display.

26. The mobile device of claim 8 further comprising an address harvester for extracting locations of calendared events stored by a calendar application on the device and extracting addresses contained in electronic messages received by the device, wherein the prediction engine further uses the extracted locations and addresses along with the stored past locations and event location data to predict the future destination.

\* \* \* \* \*